July 3, 1928.
L. E. MORRISON
1,676,152
AUTOMATIC FEEDER FOR PRINTING PRESSES
Filed April 9, 1925    13 Sheets-Sheet 4
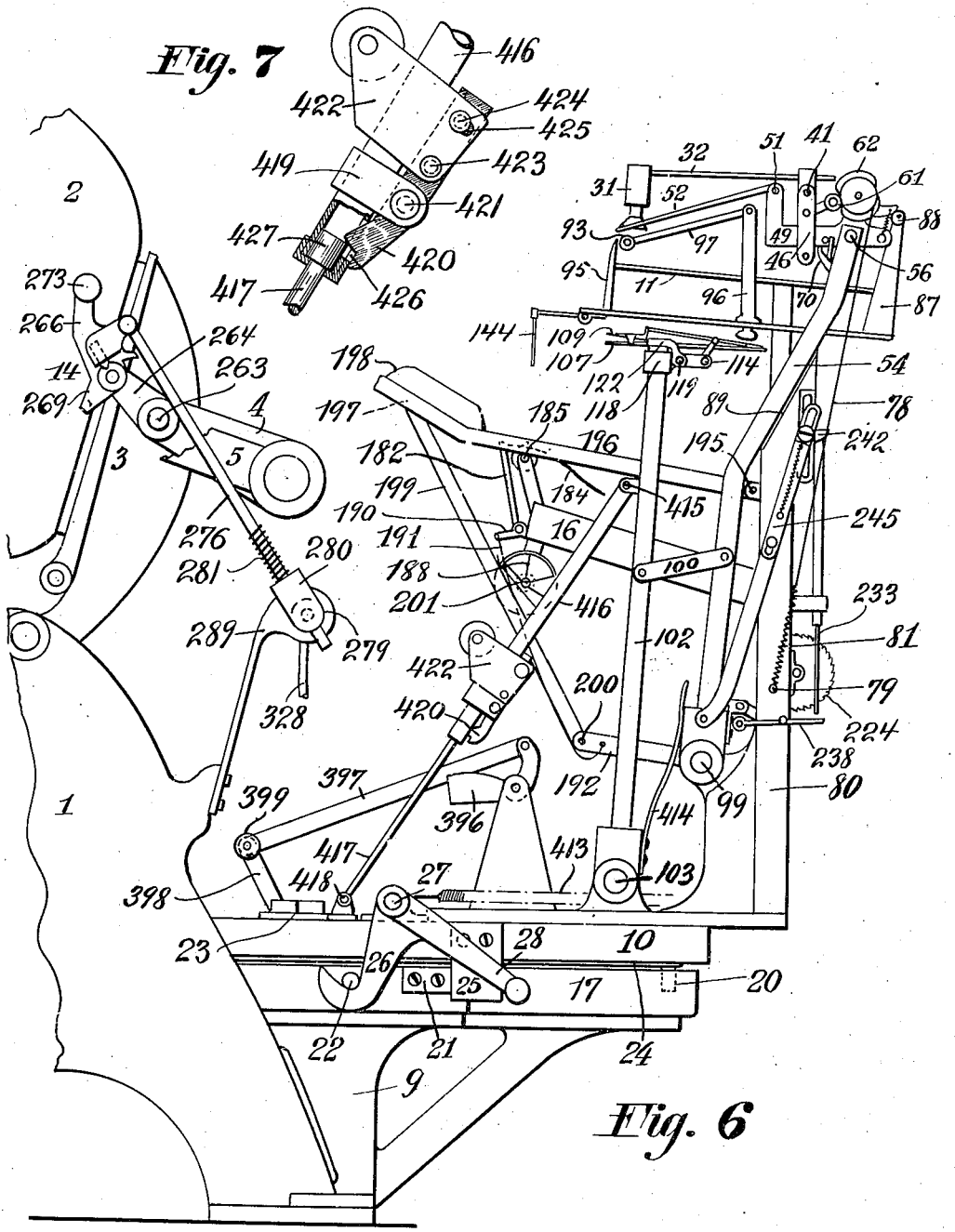
Inventor
Lewis E. Morrison
By his Attorney
Ivan E. A. Konigsberg

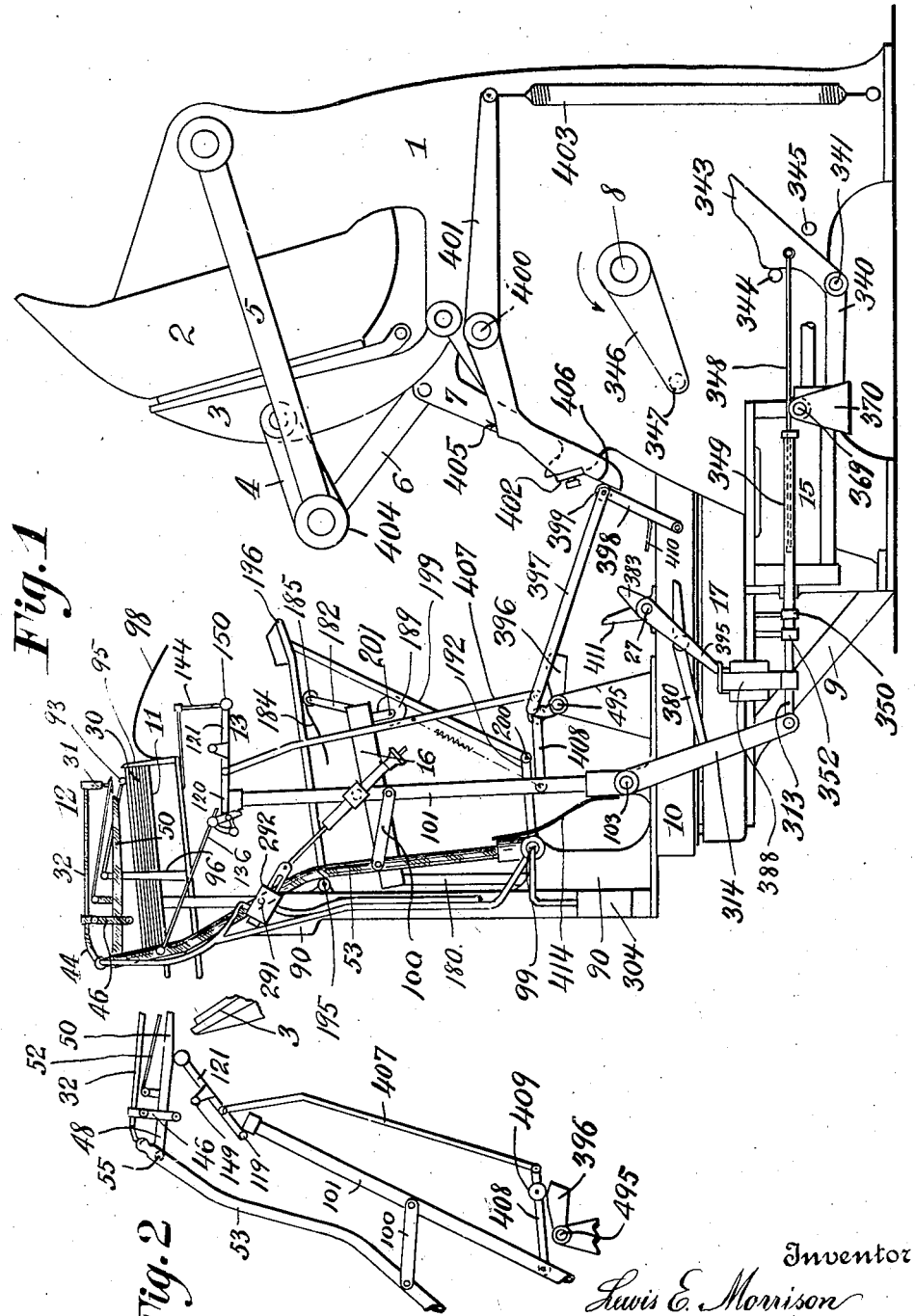

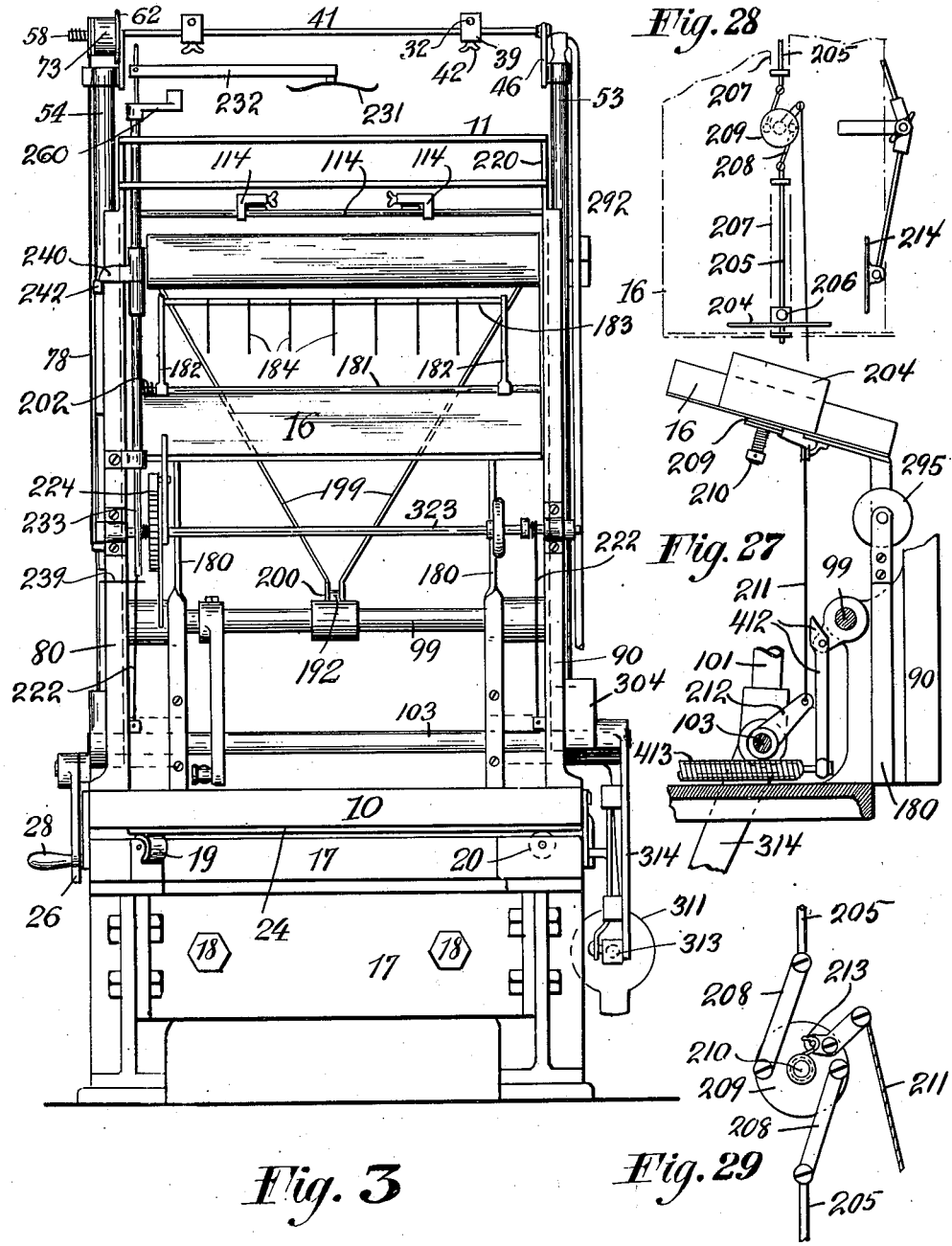

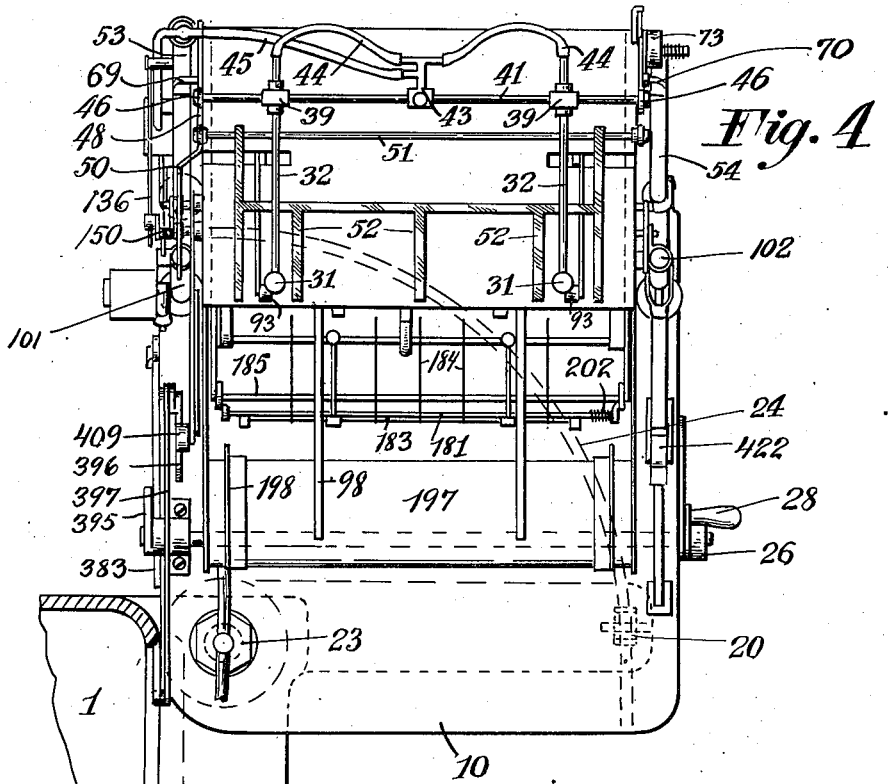
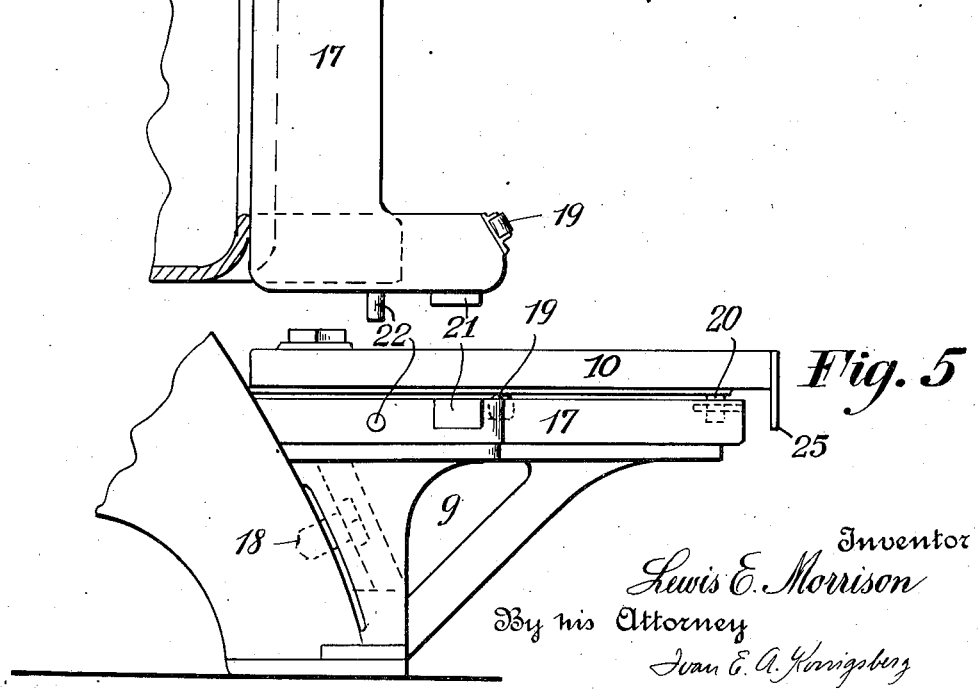

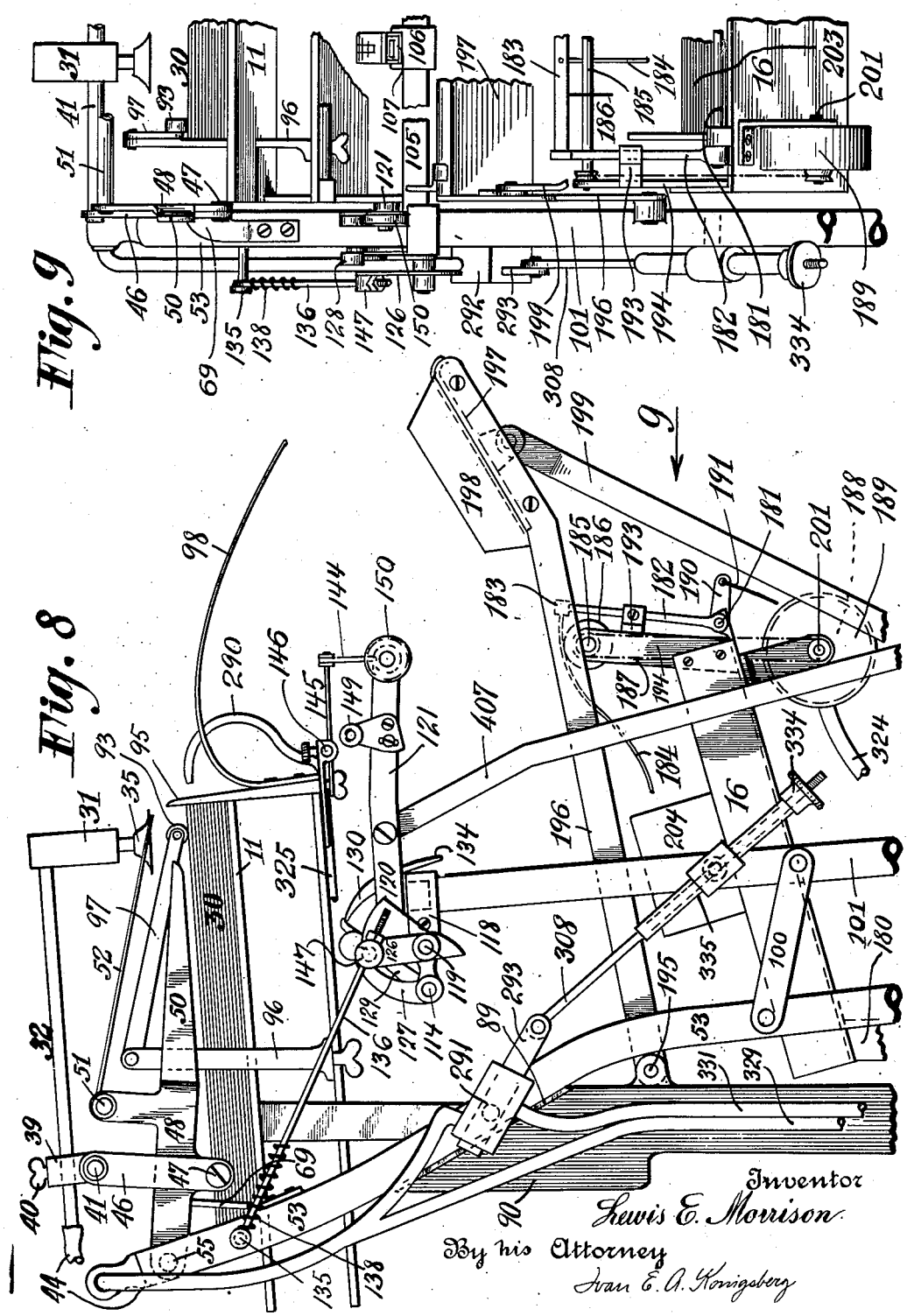

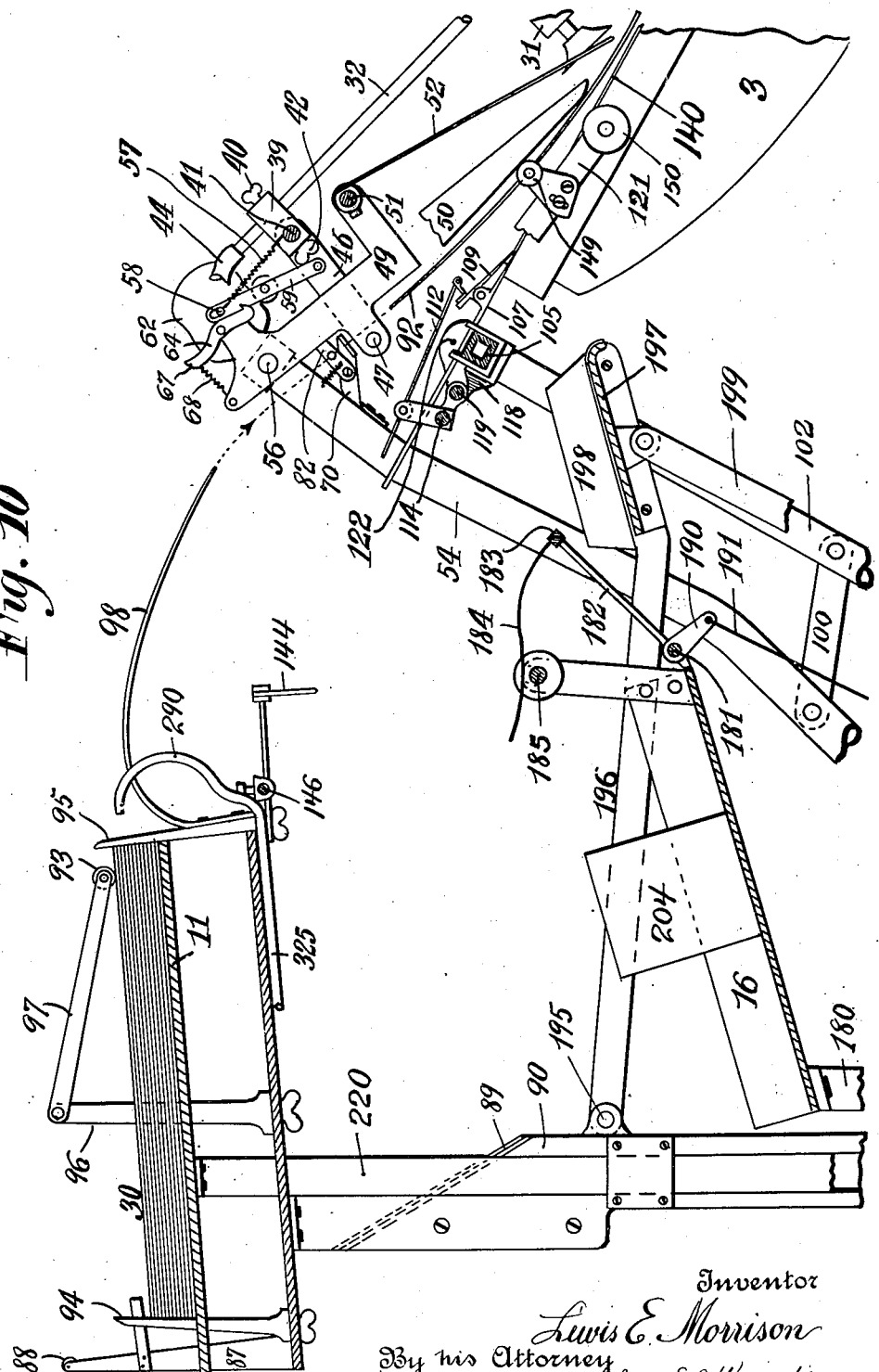

July 3, 1928.　　　　　　　　　　　　　　　　　1,676,152
L. E. MORRISON
AUTOMATIC FEEDER FOR PRINTING PRESSES
Filed April 9, 1925　　　13 Sheets-Sheet 7

Lewis E. Morrison, Inventor
By his Attorney
Ivan E. A. Konigsberg

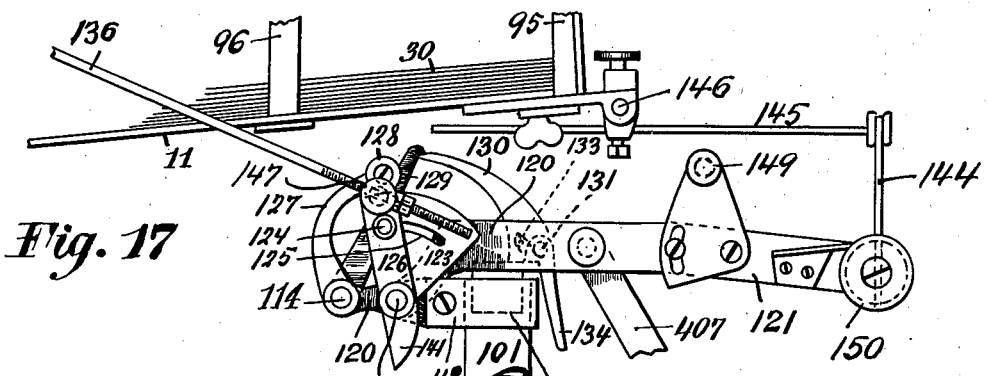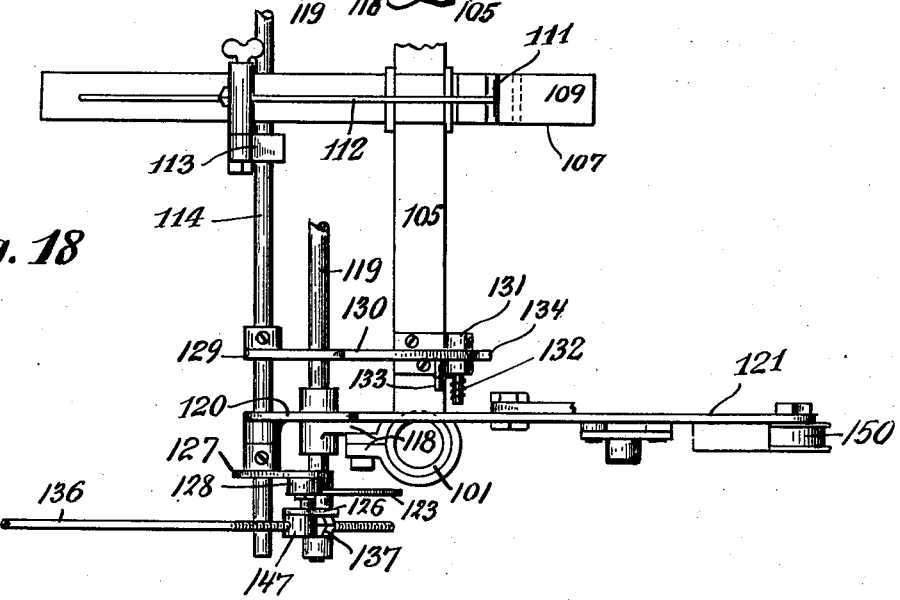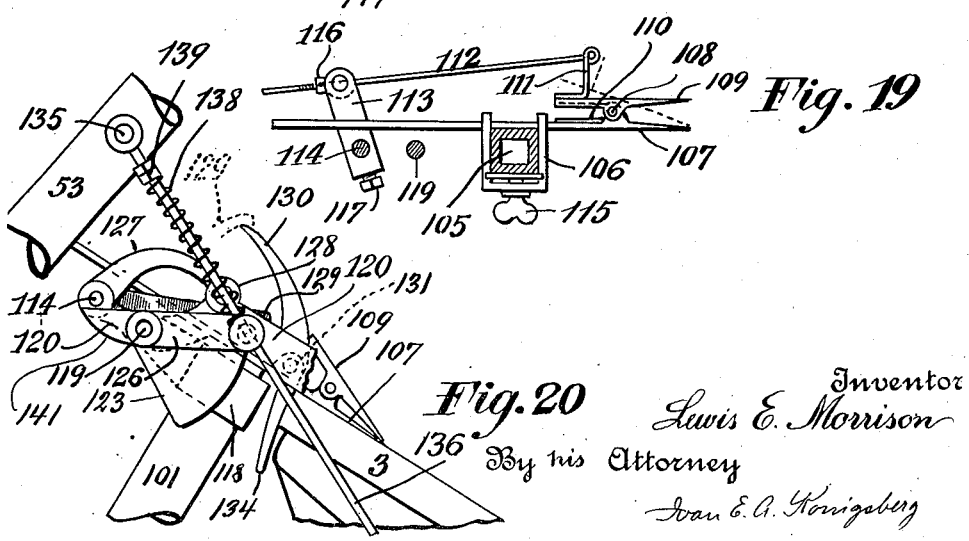

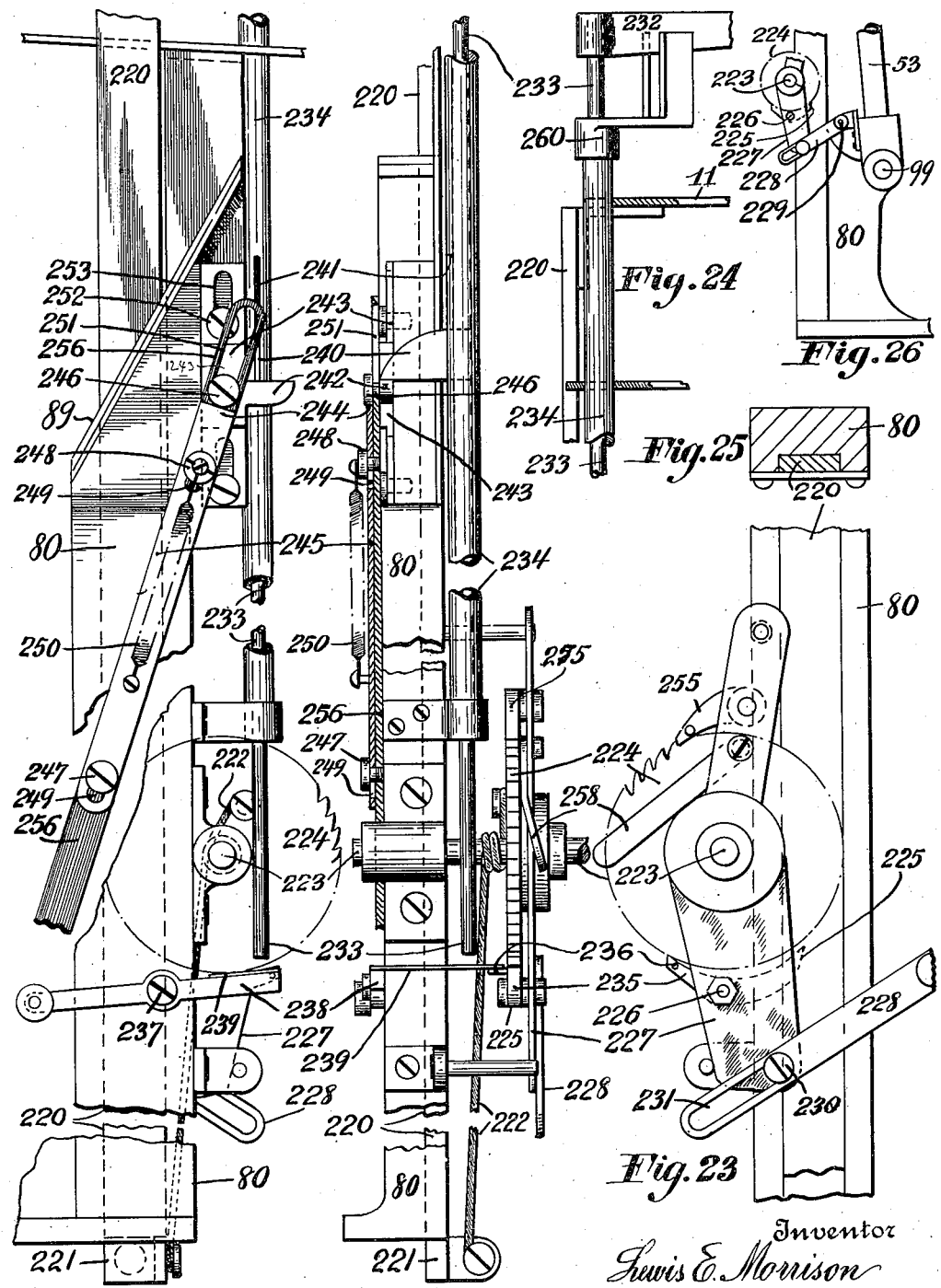

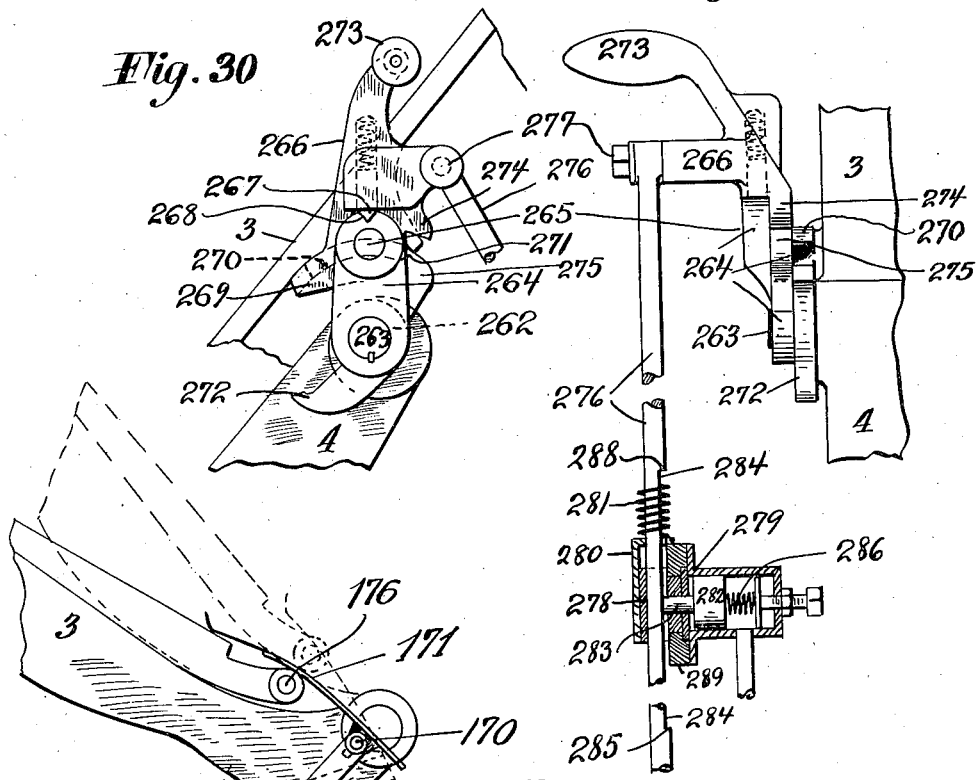

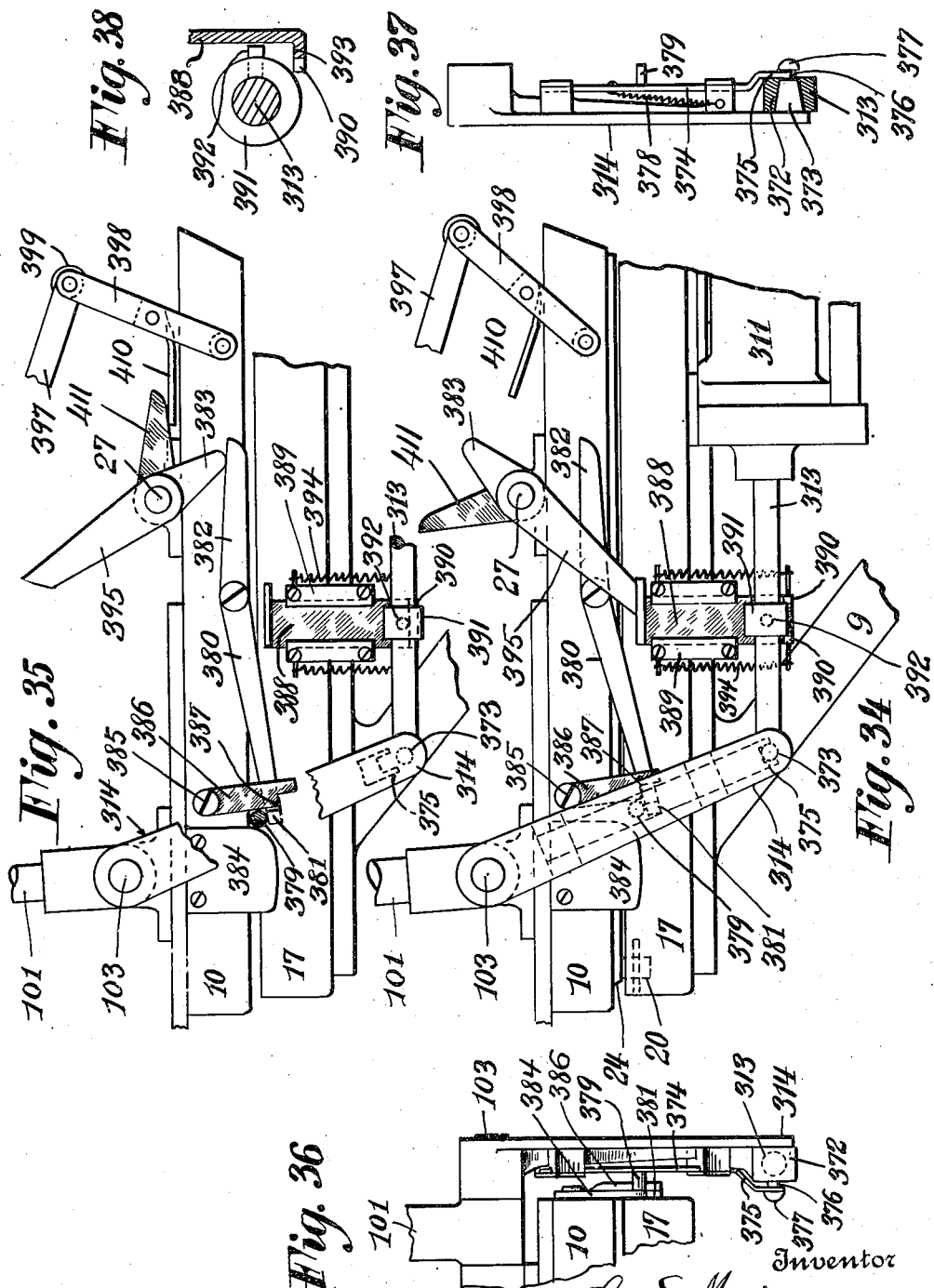

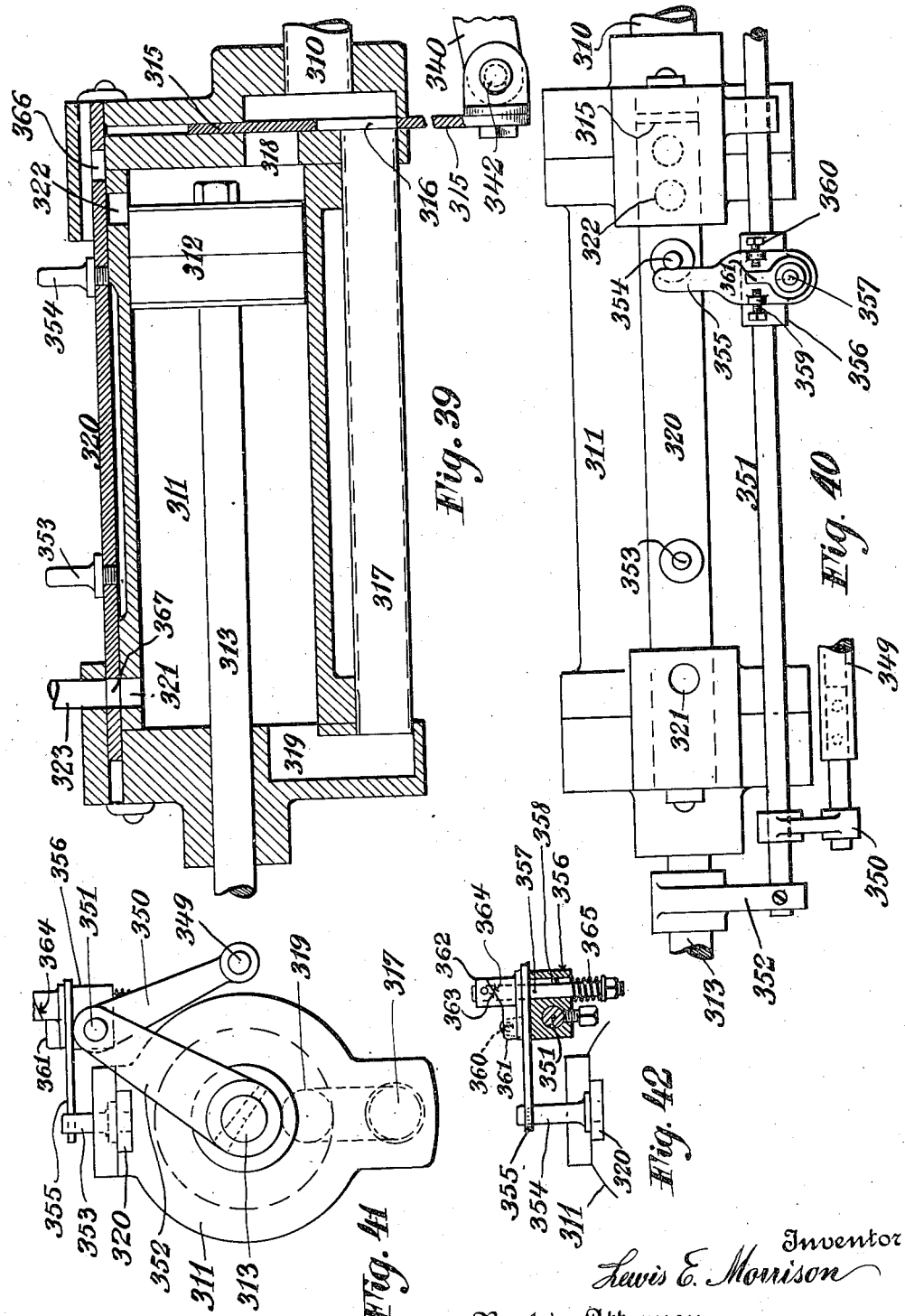

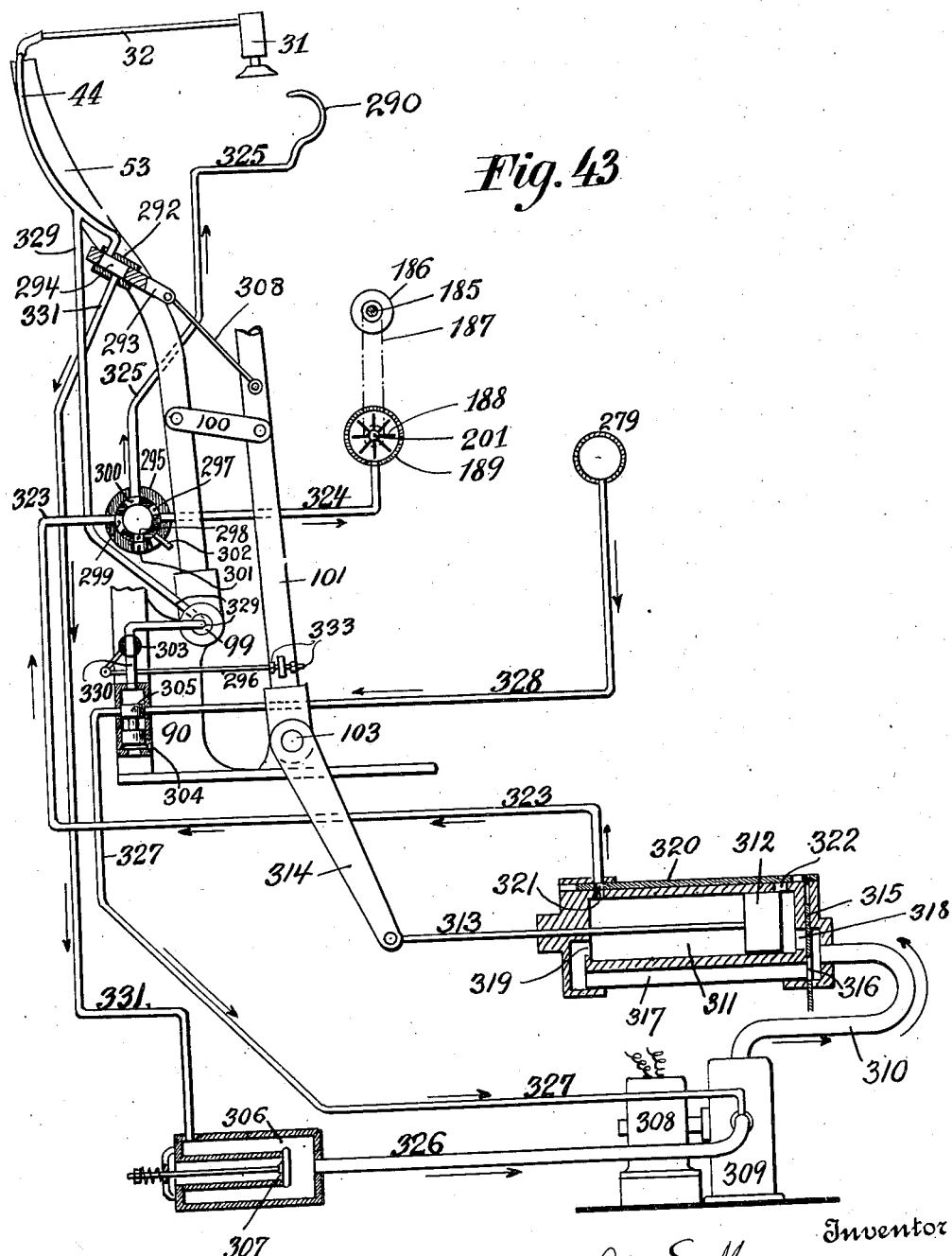

Patented July 3, 1928.

1,676,152

UNITED STATES PATENT OFFICE.

LEWIS E. MORRISON, OF NEWARK, NEW JERSEY, ASSIGNOR TO AMERICAN TYPE FOUNDERS COMPANY, A CORPORATION OF NEW JERSEY.

AUTOMATIC FEEDER FOR PRINTING PRESSES.

Application filed April 9, 1925. Serial No. 21,777.

This invention relates to an automatic feeder for platen presses of the well known Golding type, which differs from other platen presses in that the construction of the Golding press does not include means whereby the platen rests in sheet receiving position. As it is commonly said, the platen in the Golding press has no dwell, either in its sheet receiving position, or for that matter in any other position. The Golding platen is operated by a toggle joint mechanism continuously from sheet receiving or open position to impression and vice versa.

The problem to be solved in providing a feeder for the Golding press is therefore peculiar and difficult, because while on the one hand the feeder must necessarily be timed to run in synchronism with the press, on the other hand the feeding and delivery mechanism must operate very quickly and travel at a greater speed than the platen.

This invention has for its object the provision of an automatic feeder for a Golding press, and by actual tests this invention presents an entirely successful solution of the problem to be solved with respect to the speed at which the feeder must operate.

In addition, however, this invention goes beyond the mere task of fitting an automatic feeder to a Golding press in that it includes, what is believed to be an entirely novel method and construction for operating the feeder.

In providing automatic feeders for printing and similar machines of various types, it has heretofore been usual to gear the feeder directly to the printing or other machine for the purposes of operation and timing. This in turn has necessitated a more or less complicated, or at least rather extensive, addition of parts to the frame or other parts of the printing machine. It has been necessary to provide rather complicated machinery in order to properly attach and operate the feeder.

With the present invention the objectionable and often costly affixing of the feeder to the press is entirely eliminated. The feeder is built entirely separate and operated from a source which does not include as a main element the printing machine itself. The printing machine automatically times the feeder, but does not otherwise operate it. This result is accomplished by operating the feeder from a pump or air cylinder as a separable distinct prime mover. And advantage is taken of this construction to include in the mechanism operated by the pump not only the feeder itself, but several of its sub-mechanisms such as the paper separating means, the tripping mechanism and others.

The statement that the object of the invention is to provide an automatic feeder for Golding presses must therefore be understood to include also the provisions of all the sub-mechanisms, whether feeding or otherwise, which are required in order to provide an entirely automatic feeding mechanism.

On the other hand, while disclosed primarily as a feeder for a Golding platen press, it should be understood that many, if not all, of the features of this invention may be used with advantage on other types of presses, and it is not my intention to limit the invention particularly to one type of press.

The invention itself and its many features of novelty and advantage will be better understood from the following specification read in connection with the accompanying drawings in which:

Figure 1 is a right hand view of a Golding press equipped with a feeder embodying the invention. The feeder is illustrated somewhat diagrammatically with details omitted and parts broken away.

Figure 2 is a detail view illustrating certain parts of the feeder in their positions when the feeder is out of time with the press.

Figure 3 is a front view of the feeder.

Figure 4 is a plan view of the feeder showing it moved into inoperative relationship with the press.

Figure 5 is a detail view of the feeder base and supporting means.

Figure 6 is a left hand side view of the feeder.

Figure 7 is a detail view of parts shown in Figure 6.

Figure 8 is an enlarged right hand side view of the feeder mechanism, parts being broken away.

Figure 9 is a rear view of one side of the feeder looking in the direction of the arrow 9 in Figure 8.

Figure 10 is a view similar to Figure 8 but shows the feeder in feeding position with parts in section and other parts broken away.

Figure 11:
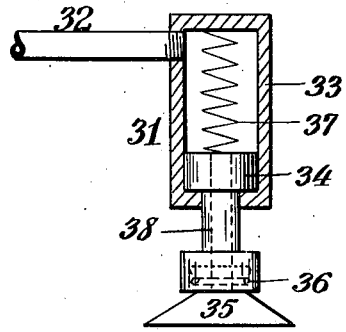

Figure 11 is a detail view in section of the paper separating suction cup or paper picker.

Figure 12:
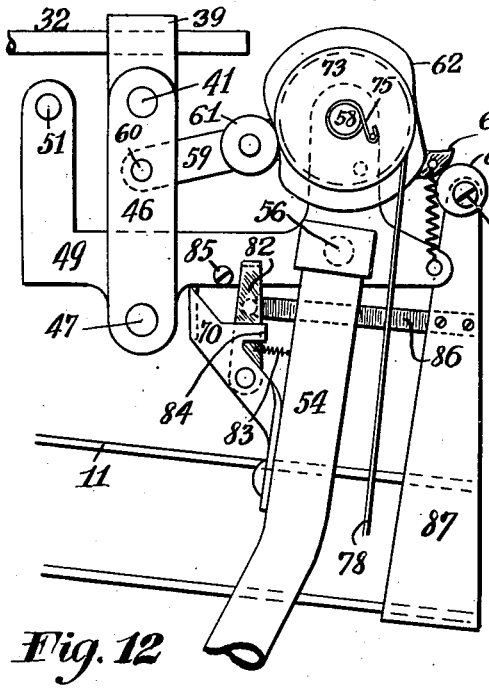

Figure 12 is an outside view of the mechanism for imparting a quick downward and pick up movement to the paper picker.

Figure 13:
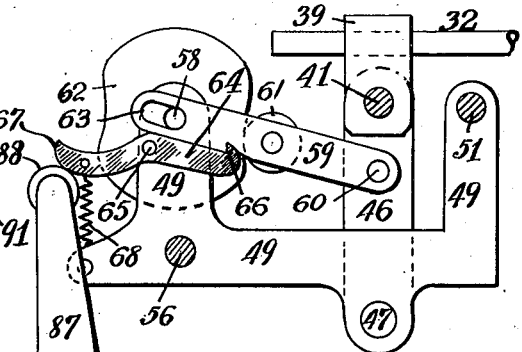

Figure 13 is an inside view of parts shown in Figure 12.

Figure 14:
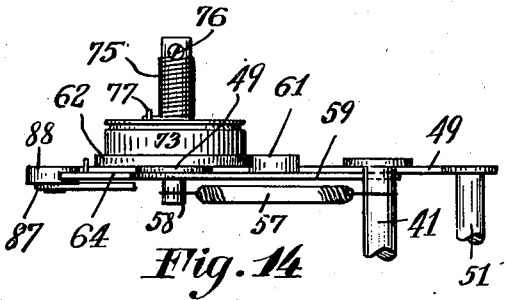

Figure 14 is a plan view thereof.

Figure 15:
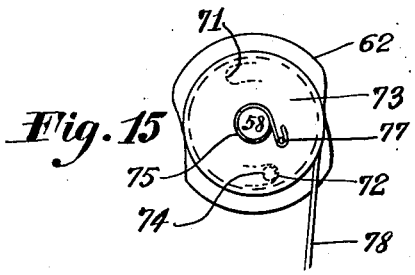

Figure 15 is a detail side view of the picker cam.

Figure 16:
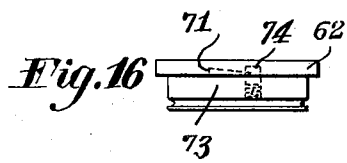

Figure 16 is a plan view of said cam.

Figure 17 is a detail view of the delivery gripper mechanism.

Figure 18 is a plan view thereof.

Figure 19 is a sectional detail view of the delivery gripper.

Figure 20 illustrates the delivery in closed position on the platen.

Figure 21 as a left hand side view of parts of the mechanism for feeding the paper to the proper height for separation.

Figure 22 is a rear view thereof.

Figure 23 is an inside detail view of parts shown in Figures 21 and 22.

Figure 24 is a view in continuation at the top of the parts shown in Figure 22.

Figure 25 is a detail view of the paper raising mechanism or pile elevator.

Figure 26 is a detail view showing the parts operating the pile elevator.

Figure 27 is a detail view of the delivery box and jogger mechanism.

Figure 28 is a plan view thereof with the delivery box in dotted outline.

Figure 29 is a detail of the jogger operating means.

Figure 30 is a side view of the tripping mechanism.

Figure 31 is a rear view thereof.

Figure 32 is a side view of the sheet registering means with parts omitted.

Figure 33 is a view of the platen and the registering means, only one half being shown.

Figure 34 is a side view showing the connecting mechanism between the feeder and the air cylinder with parts broken away.

Figure 35 is a similar view showing the feeder ready to be moved into inoperative relationship with the press.

Figure 36 is a rear view of the feeder operating lever which is connected to the air cylinder.

Figure 37 is another view of said lever.

Figure 38 is a detail view of parts shown in Figure 34.

Figure 39 is a sectional view of the air cylinder.

Figure 40 is a side view thereof.

Figure 41 is an end view of the air cylinder.

Figure 42 is a detail view of a certain stop mechanism used on the air cylinder.

Figure 43 is a diagrammatic view illustrating the operation of the air cylinder and the operation of the submechanisms actuated from the air cylinder.

Referring to Figure 1 the Golding press is illustrated in conventional outline and is identified by the frame 1, the form 2, the platen 3, the platen arms 4, the platen links 5 and the toggle links 6 and 7. 8 represents the driving shaft, which is suitably geared to the press operating shaft on the other side of the press and not shown.

The automatic feeder comprises supporting means 9 suitably secured to the press, and on which there is pivoted a base 10 which supports the feeder. The main submechanisms in the feeder are the paper support 11, the separating mechanism 12, the delivery gripper 13, the tripping means 14, see Figure 6, and the air cylinder 15 which operates the feeder.

Before entering upon a detailed description of the several parts, the general operation had better be understood and is as follows: In Figure 1 the feeder is shown in normal operative relation to the press. On the opening of the platen a sheet of paper is separated from the pile by suction pickers, and as the platen swings down the feeding mechanism swings towards the press to deposit a sheet on the platen, see Figure 10. If a sheet has previously been printed the delivery gripper seizes it and as the feeder swings back into normal position, the delivery gripper removes the printed sheet from the platen and deposits it in the delivery box 16.

The supporting means 9, Figures 1, 3 and 6, comprises a foot 17 which is suitably screwed onto the press frame by bolts 18. The foot carries two rollers 19 and 20, also a stop 21 and a locking pin 22. The base 10 is pivoted on the foot 17 at 23 and has a track 24 adapted to run on the rollers 19 and 20. The base further has a stop 25 and a hook 26 pivoted on a shaft 27 and operated by a handle 28.

When the feeder is in normal operative relation with respect to the press the hook 26 engages in under the pin 22 to lock the base to the foot and the stop 25 abuts the stop 21. The track 24 rests on the two rollers 19 and 20. When for any reason it is desired to swing the feeder away from the press into the position shown in Figure 4, the base is unlocked from the foot by unlocking the hook 26 from the pin 22 and then swing the feeder away, the track 24 running on the rollers for easy operation. In its swung away position the base rests on the foot roller 20 and at its pivot 23.

The parts are so designed and balanced that the feeder may be swung away very easily, thus giving free access to the press parts for purpose of make ready, hand feeding or for other reasons. I will now describe the

*Paper separating mechanism.*

The pile of sheets 30 rests on the paper elevator platform 11. See Figures 8, 9 and 10 for enlarged details and Figures 1, 3 and 4 for assembly. The top sheet of paper is separated from the pile by suction pickers 31 carried by hollow arms 32. Each suction picker comprises a cylinder 33 with which the arm 32 communicates, see Figure 11. The cylinder contains a plunger or piston 34 which carries a rubber suction cup 35 secured by a spring 36. A weak spring 37 forces the piston 34 downward. The plunger and suction cup has a hole 38.

The picker arms 32 pass through bearings 39 in which they may be adjusted by wing nuts 40. The bearings are adjustably clamped to a picker shaft 41 by wing nuts 42, see Figure 3. The shaft 41 carries a union 43, Figure 4, to which the picker arms are connected by flexible hose 44 and the union 43 in turn carries a rubber pipe 45 for applying suction to the pickers.

I wish here to point out that throughout this specification I refer to all hollow air connections as pipes, whether they be metal pipes, rubber hose or otherwise.

The picker shaft 41 is journaled in two upright arms 46, 46, one on each side of the feeder. The arms 46 are pivoted at their lower ends at 47, 47 to levers 48 and 49. Lever 48 is on the right side of the feeder, see Figure 8, lever 49 is on the left side, see Figure 12. The lever 48 is formed with a cam 50. Both of said levers support a shaft 51 which carry paper fingers 52, and both levers are pivoted on the same axial line to separator arms 53 and 54 on each side of the feeder. On the right side, Figure 8, the pivot is marked 55. On the left side, Figure 12, the pivot is marked 56.

The two levers 48 and 49 with the aforesaid and other parts carried thereby constitute a separator carriage pivoted on the separator arms 53 and 54. The separator carriage rests by gravity on two stops 69 and 70 secured to the separator arms, one on each side. A spring 57, shown only on Figures 10 and 14 extends from the picker shaft 41 to a cam stud 58 in the lever 49. The levers 46, 46 have a quick oscillating movement on their pivots 47. The spring 57 serves to maintain said levers and the picker shaft 41 in the position shown in Figure 13, and returns them into this position after each movement. The limit of movement to the rear or left in Figure 13 is determined by the slotted lever 59 pivoted to the lever 46 at 60 and which carries a cam roll 61 riding on a cam 62 pivoted on the aforesaid stud 58 which passes through the slot 63 in said lever 59.

The parts shown in Figures 11 to 16 constitute the pick up mechanism mounted on and movable with the separator carriage. The purpose of this mechanism is to bring the pickers down on the top sheet with an instantaneous snatching movement to insure that the top sheet be instantly lifted away from the pile the moment suction is applied to the pickers. The movement occurs the moment the separator carriage returns to the pile from the platen when the sheet is picked up.

When it is remembered that there is no dwell on the platen, it will be clear that in order to insure proper and continuous feeding, something more than a separation by mere suction is required. In addition the top sheet must be quickly lifted from the pile ready to be conveyed to the platen. The quick paper snatching movement is accomplished as follows:—

Referring to the sheet of drawing containing the said figures, the numeral 64 denotes a locking lever pivoted to lever 49 at 65 and having a hook 66 and a tail 67. The hook engages a notch in the lever 59 and prevents any movement of said lever against the pull of the spring 57 while so engaged. A spring 68 keeps the hook in the notch.

The aforesaid cam 62 is loosely mounted on the stud 58 and is provided with two diametrically opposed recesses forming teeth 71 and 72, Figures 15 and 16. Also loosely mounted on said stud 58 and adjacent to the cam 62 there is mounted a grooved pawl drum 73 having a spring seated pawl 74 adapted to engage the aforesaid teeth 71 and 72. A spring 75 coiled around the stud 58 tends to rotate the pawl drum and pawl in a rearward direction, anticlockwise in Figure 12, clockwise in Figure 13. To accomplish this one end of the spring is secured to the stud at 76 while the other end engages a pin 77 fast in the pawl drum. To the latter is secured a cable 78. The lower end of said cable is fastened at 79 to a fixed frame 30 mounted on the feeder base 10, Figure 6. A spring 81 is interposed between the point 79 and the cable 78.

Referring to Figure 12, the mechanism further includes a pivoted catch 82 held by a spring 83 against a stop 84, part of the aforesaid stop 70. The catch 82 is adapted to move in over and engage a pin 85 on the lever 49 when said catch is met by and moved rearwardly by a fixed stop arm 86 secured to a support 87 which at its top carries an eccentric cam 88.

The operation is as follows:—As the separator returns from the platen, its parts are in the positions shown in Figure 12. At the end of the movement, the tail 67 hits the cam 88 and is lifted, whereby the hook lever 64 is rotated on its pivot 65 and the hook 66 is disengaged from the sliding lever 59, which now is free to slide with its cam roll 61. There is now no force to prevent the rotation of the cam 62 and consequently the coiled spring 75 rotates pawl drum rearwardly, the pawl 74 engages the tooth 72 and the cam 62 is rotated one half revolution moving the cam roll 61 rearwardly, and consequently the sliding lever 59 pushes the separator carriage rearwardly and downwardly on the paper with a short quick movement, and is immediately pulled back or returned by the picker shaft spring 57, Figure 14.

At the same time, however, the separator arms have rebounded slightly from their forward movement at the end of which the arms 53 and 54 have hit against inclined pads 89, 89 on the aforesaid frame 80 and a similar frame 90 on the right side of the feeder. Hence the tail 67 on lever 64 moves down on the eccentric cam 88, and the spring 68 pulls the hook 66 into locking engagement with the lever 59 and the parts assume their normal positions as shown in Figures 12 and 13, but the pickers now carry the top sheet, it being understood that as the pickers descend on the paper, suction is applied at the same time as described hereinafter.

The quick pick up mechanism is instantaneous in its action. Practically all the elements operate simultaneously. The movement may be summarized as follows: When the separator arms swing forward from the platen they continue to move until they hit against the pads 89. Then eccentric cam 88 unlocks hook 66 from sliding lever 59, the latter and with it the picker shaft and pickers are thrust quickly downward on the paper by the cam 62 and as quickly returned by the spring 57, and this is followed by a relocking of the sliding lever by the hook 66, the cam roll 61 being back on the low part of the cam.

While the above described operation has taken place, the aforesaid pivoted catch 82 has prevented any upward movement on the part of the separator lever 49, because said catch has hit against the stop arm 86 and been moved in over pin 85 on said lever 49. But as the entire feeder rebounds slightly away from the fixed frame members, the catch 82 has been moved away from the stop arm 86 and assumed its normal position against the stop 84.

The separator carriage with the picked up sheet is now again moved towards the platen, during which movement the coiled spring 75 is rewound by the cable 78 pulling the pawl drum with pin 77 half a revolution against the force of said spring.

It will be noted that the cam 62 has two diametrically high and low parts and accomplishes the operation of the cam roll to actuate the sliding lever in one half revolution, and that the positions of the pawl teeth correspond to the positions of the high cam parts.

Without the quick pick up movement the suction pickers would have to be moved in over the paper to just touch the top sheet. This is difficult if not entirely impracticable. The quick pick up insures positive contact of the pickers with the top sheet, even though the pile of sheets is quite low with respect to the positions of the pickers as the latter move in over the paper. The eccentric cam is adjustable on its pivot 91, Figure 12, to enable proper timing of the pick up movement.

The separator sheet 92 is now conveyed towards the platen, Figure 10, being pulled off the pile 30 from under paper weights 93 which fall by gravity on top of the succeeding sheet. The sheets are registered on the platform 11 by front and rear fingers 94 and 95, and side guide 96. The paper weights may conveniently be pivoted on the side guides by levers 97. The aforesaid sheet fingers 52 prevent the separated sheet from blowing upwards during its travel to the platen. Curved sheet guides 98 support the sheet as it is being drawn towards the platen from the pile of sheets.

The separator carriage is swung towards and away from the platen by the separator arms 53 and 54 which are pivoted at their lower ends on a shaft 99 journalled in the aforesaid frame pieces or fixed frames or uprights 80 and 90. To this end, each of the arms is connected by a link 100 to the gripper arms 101 and 102. These latter are journalled on a shaft 103 supported on the base 10. The gripper posts carry at their top

The gripping mechanism.

This mechanism comprises a pair of delivery grippers for removing the printed sheet from the platen together with their operating means. See Figures 8, 9, 10 and particularly Figures 17 to 20 inclusive. To the upper ends of the gripper arms 101 and 102 there is secured in a suitable manner a gripper bar 105 which extends across the feeder. On the bar there is mounted one or more grippers. The description of one of them will suffice for an understanding of the invention. Referring to Figure 19 there is adjustably secured to the gripper bar a saddle 106 which carries the lower gripper jaw 107. To the latter is pivoted at 108 an upper gripper jaw 109 and a gripper closing spring 110 is interposed between the jaws. The upper jaw has a tail piece 111 to which is pivoted a gripper opening rod 112 adjustably carried in a gripper block 113 fixed to a gripper operating shaft 114. The gripper is adjusted across the gripper bar 105 to reach in over the platen in proper position to seize the printed sheet by sliding the nut 115 and at the same time adjusting the opening rod 112 by means of the nut 116 threaded on said rod. The gripper block is of course adjustable on the shaft 114 by a set screw 117.

To the top of each gripper arm 101 and 102 there is secured a bracket 118 which supports a shaft 119. On the latter is pivoted two levers. One of these is marked 120 and extends up over the top of the arm 101 and forms a safety guide lever 121. The other lever 122 extends up over the top of the arm 102 and rests there, see Figure 10. The ends of the levers 120 and 122 forward of the guide arms 101 and 102 support the said gripper actuating shaft 114.

The shaft 119 has mounted thereon a gripper opening cam 123 which by a bolt 124 and slot 125 connection is adjustable with respect to a gripper opening arm 126 also mounted on the shaft 119. To the shaft 114 there is secured a gripper opening lever 127 having a roller 128 in line with the cam 123, and also a gripper lock lever 129 adapted to cooperate with a gripper release 130 which is in the form of a lever pivoted at 131 on the gripper bar 105 and normally held in under the lock lever 129 in engagement therewith as seen in Figure 17 by means of a spring 132 which engages a pin 133 in the opener 130. The latter has a tail 134.

To the separator arm 53, Figure 8, there is pivoted at 135 a gripper opening rod 136 which passes through the upper end of the gripper opening arm 126 in which it is adjustable by a nut 137. A coiled spring 138 surrounds the rod 136 at its upper end and is adjustably secured at that point by nuts 139.

The operation of closing and opening the grippers is as follows: As the gripping mechanism moves toward the platen to remove a sheet therefrom, the gripper parts are in their normal positions as shown in Figures 17, 18 and 19 with the grippers open. In this position the grippers are kept open because the shaft 114 cannot be rotated to swing the gripper block 113 towards the bar 105 to permit the upper jaw to close on the lower jaw, for the reason that the release 130 is held firmly in under the lock lever 129 by the spring 132, and the lock lever is fast on the said shaft 114. And for the same reason, opening lever 127 is held in normal position, it also being fast on shaft 114.

However, during the movement toward the platen, the separator arms 53 and 54 move closer and closer to the gripper arms 101 and 102, see Figure 10, and consequently opening rod 136 turns the opening arm 126 more and more downward (the bolt 124 moving in the cam slot 125).

When the grippers reach the platen as in Figure 20, the lever 126 has been operated far enough to affect the cam and move the latter from under the roller 128 and the lower jaw 107 passes in under the printed sheet 140, Figure 10 and at the same time the tail 134 of the release 130 hits the platen with a slight blow. This causes the release to be rocked on its pivot 131 away from under the lock lever 129. At this time there is nothing to prevent the rotation of the shaft 114 and consequently the gripper closing spring 110 snaps the grippers shut and the jaws close on the sheet, at the same time rotating shaft 114 through the instrumentality of the members 111, 112 and 113. The parts then assume closed position as in Figure 20 where it will be seen that the coiled spring 138 has reached lever 126 to act as a buffer, and the opening lever 127 and lock lever 129 have also been moved down. The tail piece 141 on the lever 126 takes in under shaft 114 to prevent said lever 126 and cam 123 from being pushed further down by the rod 136 as is obvious.

Immediately after the printed sheet has been seized, the return movement commences and the parts now operate in the reverse direction. That is to say as the separator arm 53 moves quickly back, the opening rod 136 slides through the arm 126 and moves said arm leftwardly on the drawing (the bolt 124 sliding in the cam slot 125) until at the point where the grippers are to be opened, the arm 126 moves the cam in under the roller 128 and turns the shaft 114 in an anti-clockwise direction thereby also swinging the block 113 forward to open the grippers to deliver the sheet. The turning of the shaft 114 of course causes the lifting of the release 129 until it comes back into starting position as in Figure 17 and the opener 130 snaps in under it.

The sheet is stripped from the grippers by resilient rubber fingers 144 carried by rods 145 adjustably held on a shaft 146 beneath the paper support 11.

From the foregoing it will be noted that the position of the grippers is adjustable for different sizes and positions of sheets on the platen. That the closing cannot take place until the gripper release 130 hits the platen and means are provided in the gripper lock lever 129 to keep the grippers open until the exact closing moment occurs. Also that the opening of the grippers may be timed and adjusted by adjusting the arm 126 with respect to the cam 123 which lifts the cam roll 128 and lever 127 to impart an opening movement to the gripper actuating shaft 114.

As a matter of practical construction, the rod 136 will pass through a swiveled head 147 in the arm 126.

Referring now to Figure 10 it will be seen that the aforesaid safety guide lever 121 functions at the time the sheet is delivered to the platen by the separator mechanism in that said lever carries an adjustable and a fixed guide roller 149 and 150. The adjustable roller 149 will be set at the proper height on the lever 121 so that the separator cam 50 when it engages said roller will lift the separator carriage at the proper height in over the platen 3. And as seen in Figure 2, the fixed roller 150 serves to lift the separator mechanism entirely out of sheet deposit position if for any reason the feeder should attempt to feed out of time with the press. This latter feature will be explained later. After having been deposited on the platen and before printing, the sheet is registered by means of the

Registering mechanism.

This mechanism includes sheet stops or gages for properly registering the leading edge of the sheet on the platen, sheet fingers which move in over the edge of the sheet to press the same down on the platen to prevent curling or bending. Side registering means may also be employed and may be of the type disclosed in my U. S. Patent Number 1,111,968 and not shown herein.

Referring now to Figures 32 and 33, the platen 3 has a depending arm 160 which normally is a part of the press mechanism. The shaft 161 in Figure 32 is the lower pivot of the toggle mechanism and is stationary on the press. To the said shaft 161 is secured a roller 162 mounted in a circular bearing 163 adapted to be adjusted circumferentially of the shaft by adjusting means 164.

To the platen arm 160 there is secured a support 165 to which is pivoted at 166 a finger lever 167 having a cam 168. 169 indicates a stop on the arm 160. The upper end of the finger lever 167 supports a finger rod 170 to which there is secured a plurality of resilient sheet fingers 171. These latter are in two pieces adapted to be adjusted lengthwise by a strap 172. The sheet fingers 171 are pressed down on the platen by a spring 173, Figure 33. Other sheet fingers 174, only one being shown, are mounted on the aforesaid fingers 171.

The numeral 175 denotes the sheet gages which are mounted on the frisket finger shaft 176 and acuated thereby to move into proper position on the platen. A spring 177 keeps the gages in contact with the platen.

In operation, where the platen opens or moves down into sheet receiving position as shown in full lines in Figure 32, the pivot 166 is moved down to cause the cam 168 to ride on the roll 162 whereby to lift the upper end of the lever 167 to move towards the platen with the result that the sheet fingers 171 and 174 are moved in over the platen on top of the sheet which is placed thereon and thus press down the leading edge of the sheet in an obvious manner.

When the platen closes on the impression stroke, the parts are moved into the positions in dotted lines in Figure 32, the lever 167 dropping by gravity against the stop 169, and the sheet fingers move away from the platen in a position of rest on the frisket finger bar 176 as shown. At the same time the gaskets move up on the platen in the usual manner to stop the sheet. After printing, the sheet is removed from the platen by the delivery grippers as aforesaid and deposited in the delivery box 16.

The delivery mechanism.

This mechanism includes the instrumentalities for guiding the printed sheet into the delivery receptacle 16, and are best seen in Figures 3, 8, 9 and 10.

The receptacle 16 is carried by suitable supports 180, 180 at the front of the press. At the rear edge or entrance into the box 16 there is journaled a shaft 181 which carry two uprights 182, 182. A bar 183 is fixed to the upper ends of the uprights 182 and said bar carries sheet guiding and supporting fingers 184 in the form of curved wires.

At each side of the box 16 there is also supported a shaft 185 which carries thin rubber disks 186. The shaft 185 is adapted to be driven by a belt 187 from a turbine shaft 201 supported underneath the box 16. The turbine shaft carries a turbine or wind wheel 188 within a cylindrical casing 189. The shaft 181 carries an arm 190 connected with a cable 191 to another arm 192 secured to the shaft 99 to which the separator arms aforesaid are secured. This feature is shown clearly in Figure 6. One of the said uprights 182, Figure 8, carries a stop 193 which is held against the one support 194 for the said shaft 185 by a spring 202 coiled around the shaft 181, Figure 4.

To the aforesaid fixed frames 80 and 90, Figure 3, there is pivoted at 195 on each side of the feeder a lever 196 which extends towards the platen. The free ends of the levers 196 are joined by a shelf 197 having side guides 198. From the levers 196 links 199 extend downward. The lower ends of the links are pivoted at 200 to the aforesaid arm 192.

In operation when the platen is closed the delivery mechanism elements are in the positions shown in Figures 1 and 8. The sheet fingers 184 are held in over the delivery box 16 by the spring 202 which tends to rotate the shaft 181 anticlockwise, the stop 193 resting against the support 194. The turbine 188 is not running.

Referring now to Figure 10 it will be seen that as the platen moves down into sheet receiving position, the levers 196 are lowered on their pivots 195 by the links 199 which are moved down due to the downward movement of the arm 192 on shaft 99, Figure 6, which shaft is moved anticlockwise in said figure.

Consequently the shelf 197 is lowered just past and slightly below the platen as in Figure 10 to bridge the gap between the platen and the delivery box. At the same time, however, the shaft 181 has been rotated clockwise in Figure 10 by the cable 191 and arm 190 against the action of the spring 202 to open up, as it were, or move towards the platen, the sheet guiding fingers 184. The combined effect of these movements is, that as the printed sheet is removed from the platen in over the shelf 197, fingers 184 and towards the delivery box, said shelf and fingers are raised and support the body of the sheet, the delivery edge of which is held by the grippers, and raises the rear portion of the sheet so that the latter is evenly and smoothly delivered into the box 16. If it is desired to impart to the sheet a quick motion into the box 16, the turbine 188 is operated (by means described hereinafter) to rotate the shaft 185 and rubber disks 186 (in contact with which the sheet is being delivered) to cause said rubber disks to frictionally engage the sheet to speed it on its way into the box 16. This is a very necessary feature with thin and large sheets to get them quickly out of the way and prevent them from being blown about. The numeral 203 in Figure 9 indicates the delivery sheets in the box 16 in which they are jogged into final position by the

*Jogging mechanism.*

See Figures 27, 28 and 29. This mechanism is very simple in construction and comprises two movable side joggers 204, 204 mounted on rods 205, 205 by suitable adjustable clamping means 206. The latter extend into slots 207, 207 cut in the bottom of the delivery box. The inner ends of the rods 205 are connected by links 208 to a disk 209 mounted to rotate on a shaft 210. The disk is rotated in one direction to open the joggers 204 to receive the printed sheet between them by means of a cable 211 secured to an arm 212 on the shaft 103 which moves with the gripper arms 101 and 102 aforesaid. A spring 213 automatically rotates the disk in the opposite direction to close the joggers on the delivered sheets and properly stack them. Adjustable front stops 214 are also provided and the sheets fall against them.

It will be understood that there is a jogger 204 and front stop 214 on that half of the delivery box not shown in Figure 28. It will further be apparent that the side guides 198 aforesaid, Figure 8, on the shelf 197 are adjusted for the width of the sheet by being simply moved sideways on the shelf and that this adjustment corresponds to the adjustment of the joggers across the feeder. In order to operate the feeder rapidly to supply the platen with paper, it is necessary that the stack of paper 30 in the feed box or support 11 be kept up to a certain level to cooperate properly with the separating mechanism. This is accomplished by the

*Pile elevator mechanism.*

The pile elevator, Figures 3, 6 and 21 to 26 inclusive comprises the elevator platform 11, upon which the paper rests, carried by two supports 220, 220 mounted to slide vertically in the fixed frames 80 and 90 on each side of the feeder at the front thereof. The lower ends 221 of the supports are connected by cables 222 to a ratchet 224 on a winding shaft 223 suitably journaled on said frames. To the shaft is secured a ratchet 224 which is engaged by a pawl 225 to rotate the shaft 223 to wind up the cables to lift the elevator. The pawl is pivoted at 226 to an arm 227 which is operated once to each feeding stroke of the feeder by means of a link 228 pivoted at 229 to the separator arm 53, Figure 26. The link 228 is connected to the arm 227 by a pin 230 and slot 231 connection so that the said shaft 223 will be rotated to lift the elevator towards the end of the feeding stroke when the separating mechanism is clear off the paper 30.

It is obviously undesirable and almost impossible to lift the elevator for each sheet removed from the pile of paper 30, because the lifting movement is necessarily greater than the thickness of a sheet of paper. Means are therefore provided for controlling the operation of the actuating pawl 225 aforesaid so that it will engage the ratchet 224 only when the pile of paper 30 has been depleted to a certain low level below the pickers 31.

This is accomplished by a feeler 231, Figure 3, which is adapted to rest upon the paper by gravity, said feeler being secured to an arm 232 mounted on the upper end of a pawl controlling rod or member 233 which slides within a guiding tube 234. The lower end of said controlling rod 233 is adapted to cause the engagement of the pawl 225 with the ratchet 224. Normally the pawl is disengaged from the ratchet by gravity in that the pawl of its own weight falls away from the ratchet until stopped by the pawl stop 235 which carries a pin 236. To the frame 80 is pivoted at 237 a balanced lever 238 which carries a shelf 239 which extends in over and rests on the said pin 236.

When the feeler 231 has moved down on top of the paper 30 to a level which requires the paper to be elevated, the control rod 233 is caused to drop upon the shelf 239 to tip the pawl 225 into engagement with the ratchet 224.

It is obvious, however, that the feeler 231 cannot be left to rest on top of the paper with the weight of the control rod 233 because such a condition would prevent the separation of the top sheet. Means are therefore provided for normally taking the weight of the control rod off the paper at the time separation takes place and between each separation the control is permitted to drop, so that if the control drops to paper level between separations it will cause the engagement of the pawl and ratchet as aforesaid.

To this end the control rod carries a dog 240 which extends through a slot 241 in the tube 234. Said dog is adapted to rest on a stop 242 carried by a slide 243 on the side frame 80. The stop slide 243 rests by gravity on the upper end 244 of a stop control member 245, the slide having an abutment 246 for this purpose. The stop control 245 is in turn carried by a link 256, see Figure 6, which is pivoted at 247 to the separator arm 54. The link 256 has two stop screws 247 and 248, and the stop control has two slots 249, 249 through which said screws project. A spring 250 tends to pull the stop control upwardly on the screws 247 and 248 to the limits of the said slots 249. The link 256 also has a slot 251 which rides on the abutment screw 246 aforesaid. The stop slide 243 is guided by screws 252 in slots 253.

The entire operation of the pile elevator mechanism and the controlling means therefor is as follows:—

When the separator carriage moves toward the platen with a separated sheet, the link 256 is pulled down also, its screws 247 and 248 moving in the slots 249. But this movement of the screws does not affect the position of the stop control 245 because the relative sliding movement of the link 256 with respect to the stop control 245 is compensated for in the spring 250 which still keeps the end 244 of the stop control up under and against the abutment screw 246.

When, however, the link screws 247 and 248 have reached the bottoms of the slots 249, the continued movement or pull of link 256 causes the stop control 245 to move downward away from the abutment screw 246, thus permitting the stop 242 to drop away from under the dog 240. Hence the latter and the feeler control are free to drop within the tube 234.

If there is sufficient paper in the pile 30, the feeler control will not be able to drop all the way down on the shelf 239 to tilt the pawl 225 into engagement with the ratchet 224 to raise the elevator, and in such case the feeler will simply drop on the paper, and when the separating carriage returns, the stop slide 242 will be moved upwards under the dog 240 by the reverse movement of the link 256, and thereby lift the dog and feeler off the paper.

If the paper need to be raised, the control rod will fall down on the shelf 239, the pawl 225 will be tilted and as the separator arm 53 moves forward on the next feeder stroke, Figure 26, the ratchet 224 will be rotated to turn shaft 223 and the elevator will be raised.

The upper end of the cable 222 is wound around the shaft 223 and then secured to the ratchet 224. The numeral 255 denotes a stop pawl for the ratchet 224. A handle 258 is adapted to be swung upward to raise said stop pawl when the shaft 223 will be rotated by the weight of the elevator acting on the cables 222. 259 is a hand-wheel, Figure 3, for rotating the shaft 223 by hand.

260 is a forked guide on top of tube 234. The feeler arm 232 is guided in said guide in proper position in over the paper. The guide 260 is frictionally adjustable on tube 234.

The tripping mechanism.

The Golding press, like other platen presses, is provided with a mechanism for tripping the platen when for any reason such action becomes necessary or desirable. If the press is equipped with an automatic feeder, it is necessary to provide automatic means for operating the tripping mechanism when for any reason the pickers fail to pick up a sheet. In such case the platen must be tripped to avoid injury and spoilage.

This invention provides such automatic tripping means for operating the regular Golding press hand operated tripping mechanism, which is shown in detail in Figures 30 and 31, and in outline in Figure 6. The platen 3 is mounted on a tripping shaft 263. When the press is to be tripped, the shaft 263 is rotated around an eccentric so as to withdraw the platen from normal printing position into a position where the press will not reach the form, when the press closes. Hence the tympan of the platen will not be printed upon by the form, that is the platen or press is tripped as it is called in the art.

Referring to Figures 30 and 31, the shaft 262 is provided with an eccentric 263. To the latter is keyed an arm 264 which as seen in Figure 31 is a casting formed with steps or offsets whereby to provide a stop 272 adjacent the platen, and a body portion formed with an ear 275 a distance away from the platen. The body is then off-set further away from the platen to provide for a pivot at 265.

Between the body of the arm 264 and the platen, and in the same plane as the stop 275 there is secured to the side of the platen a locking cam 270 in the form of a curved segment. The width of the cam in Figure 30 is from the dotted line shown to the left and to the rounded corner shown to the right at 271.

At 265 there is pivoted to the arm 264 a lever 266 which extends upwardly and away from the side of the platen and forms a grip 273. The lever has a heel 274 in the plane of the aforesaid ear 275 and is also formed with a forwardly extending portion having a tooth 269 which extends towards the side of the platen in the plane of the locking cam 270.

The lever 266 is locked to the arm 264 by a spring latch 267 which engages a V-notch 268 in the arm. From the description thus far it will be perceived that the Golding tripping mechanism consists mainly of two parts, the arm 264 and the lever 266 which are normally locked together. In turn the two parts are locked to the platen by the tooth 269 which engages against the end of the locking cam 270. So long as the parts are in this position, the platen remains in normal operative position.

Broadly speaking when the platen is to be tripped, the lever 266 is first moved to disengage the tooth 269 from the cam 270, and to break the lock at 268—269 between itself and the arm 264. Thereafter the two elements 264 and 266 are moved together to turn the eccentric and trip the platen.

Specifically the operation is as follows: The operator takes hold of the grip 273 and moves lever 266 clockwise on the pivot 265 thereby unlatching the lever from the arm and at the same time lifting the tooth upward out of engagement with the cam 270. This first movement is arrested when the lever heel 274 hits the arm ear 275. Tooth 269 now lies on top of cam 270.

The operator now continues the clockwise movement of lever 266 and of course also moves the arm 264 because the parts 274—275 prevents relative movement between the lever and arm. The clockwise movement is arrested altogether when the bottom stop 272 hits the forward left end of the cam 270. As a result of the clockwise movement the eccentric 263 has been rotated to turn the tripping shaft 262 to move the platen into tripped position. Also as a result of the clockwise movement and at the end thereof, the tooth 269 has been moved to the right on top of the cam 270 and now lies against the right rounded end 271 of the cam.

A movement in the opposite direction untrips the platen. Specifically the operator takes hold of grip 273 and moves it anticlockwise on pivot 265. This is a very short movement and causes the tooth 269 to slip downwardly off the rounded cam end 271 and in under the cam. As the movement continues, the tooth slides along and against the underside of the cam for the purpose of preventing further relative movement between the lever 266 and arm 264 until, at the end of the movement, the arm 264 is back into normal position, when the tooth 269 snaps up in front of the cam 270, the latch 267 re-engages the notch 268 and the parts are back in interlocked normal position, locked to the platen and the latter has been untripped.

In other words, the eccentric carries a two-part lever consisting of arm 264 and lever 266. The two parts are normally locked together and to the platen. In tripping, the two part lever is broken at 265 and the upper part, lever 266, unlocked from the platen and engages the arm 264 at 274—275. The two part lever then swings to the right to rotate the eccentric. In untripping, the upper part 266 is moved sufficiently with respect to the lower part 264 to permit tooth 269 to move on the under side of the cam 270 to compel the arm 264 to follow the lever 266 during the anticlockwise movement. At the end of the movement, the two part lever straightens itself naturally back into normal interlocked position and locked to the platen. There is nothing novel in the foregoing description of the Golding press tripping mechanism. It is standard on Golding presses.

This invention provides automatic means for unlatching the lever 266 and moving it and the arm 264 clockwise, and vice versa, to trip and untrip the platen. To this end a rod 276 is pivoted on the handle at 277 and extends downward, see Figure 6. The rod 276 passes through a swivel 278 rotatably mounted in a bracket 289 secured to the press and which carries a tripping cylinder 279. The rod is guided in a bracket 280. A spring 281 is coiled around the rod. The tripping cylinder has a piston 282 with a stem 283 adapted to project into a cut out portion 284 on the rod 276 in the path of the shoulder 285 formed on the rod. A spring 286 keeps the stem 283 normally in projected position as shown.

When the platen is down or in sheet receiving position, suction is applied to the pickers to pick up a sheet. At this time the rod 276 will have passed down through the guide 280, but as suction at the same time is also applied to the tripping cylinder (to be described later) the piston 282 and stem 283 will be sucked back into the air cylinder 279 and there will be no obstruction to the free passage of the rod 276 and the tripping mechanism will not be actuated.

If, however, the pickers 31 fail to pick up a sheet, suction will not be applied to the tripping cylinder and the stem 283 will remain projected as shown. By this time the platen will have moved up close to the bed taking the rod 276 along and the shoulder 285 on the rod will encounter the piston stem 283. Hence the rod will be prevented from following with the platen, and hence the pivot 277, being thus arrested in its movement will cause the handle 266 to turn to rotate the arm 264 to trip the platen.

On the opening stroke of the platen, it is, however, automatically untripped, because the stem 283 is now in the path of the upper shoulder 288 formed in the rod 276. On the downward stroke, therefore, the rod will be arrested in its movement when the shoulders 288 reached the stem 283, and consequently the rod will stand still and cause the tripping handle 266 and arm 264 to be rotated back into untripped position. When the handle 266 is almost down to the tripping cylinder, it moves against the spring 281 which is compressed and acts both as a cushion and also as an aid in untripping.

On the following closing stroke, suction will or will not be applied to the tripping cylinder. If suction is applied, it is because tripping is not called for. If suction is not applied, the piston stem 283 will again arrest the movement of the rod 276 to trip again.

*The operating mechanism.*

It is believed that this invention is broadly new with respect to its operating mechanism in that the feeder is not driven directly from any part of the press, but from a separate prime mover or mechanism not connected to the press. In the present instance an air cylinder is employed, and besides driving the feeder, the air cylinder and the air pump for operating the cylinder are advantageously employed to operate such parts of the press as are pneumatically operated or actuated. These features of the invention may best be understood by a reference to Figure 43 which diagrammatically illustrates the same.

This figure diagrammatically shows the suction pickers 31, a sheet nozzle 290 for blowing air on the pile of sheets to assist in separating them. Also the turbine 188 and the tripping cylinder 279, all in their respective relative positions on the feeder. Other mechanisms or elements which form parts of the operating mechanism are as follows.

On the separator arm 53 (which carries the separator carriage together with the arm 54) there is pivotally supported at 291, Figures 1 and 8, a valve 292 controlled by a slide 293 which has a port 294. The slide is operated by a link 308 pivoted on the gripper carriage arm 101, heretofore described.

At some suitable point of the feeder there is mounted a distributor valve 295 having a valve with four ports 297, 298, 299 and 300. A port 301 leads to the atmosphere, and the valve is set by a handle 302. The numeral 303 denotes a two-way valve operated by an arm 296 adjustably mounted on post 101 aforesaid. The numeral 304 denotes a plunger valve having a plunger 305, and 306 denotes an air chamber having a valve 307. The plunger valve 304 is normally closed by gravity, but is opened by suction from valve 303 at predetermined intervals as will appear hereinafter. The names of the valves are purely arbitrary and for identification purposes only. They may be called by other names.

The numeral 308 denotes an electric motor which drives an air pump 309 connected by an air supply pipe 310 to the feeder air cylinder 311. The latter has a piston 312, and the piston stem 313 is pivotally connected to an arm 314 fast on the shaft 103 of the feeder. In the cylinder there is a slide 315 having a port 316, also a by-pass 317 which communicates at both ends with the interior of the piston cylinder through ports 318 and 319. On top of the cylinder there is a slide 320 with ports 321 and 322.

The several elements in the pneumatic system are connected by pipes as follows.

From the air cylinder 311 a pipe 323 leads to the distributor valve 295. From the latter a pipe 324 leads to the turbine 188. Another pipe 325 leads to the nozzle 290. The air pump 309 draws air through a pipe 326 from the air chamber 306, and also through a pipe 327 from the plunger valve 304. The latter is connected by a pipe 328 with the trip cylinder 279. The slide valve 292 is connected by the pipe 44, mentioned in the foregoing, with the pickers 31. Another pipe 329 leads from valve 292 to the two way valve 303. The pipe 329 joins the pipe 44 and passes conveniently through pivot 99. Two way valve 303 has a pipe 330 leading to the plunger valve 304. Still another pipe 331 leads from slide valve 292 to air chamber 306.

During operation the pump 309 is kept running continuously by the motor 308 (the press is of course operated steadily by any suitable power). The pump draws air from the pickers 31 by way of pipe 44, slide valve 292, pipe 331, air chamber 306 and pipe 326 and thus suction is applied to the pickers to pick up a sheet. At the same time, the pump also draws air through pipe 329 through two way valve 303 and pipe 330 and of course creates a vacuum in plunger valve 304, and plunger 305 is lifted. This movement opens communication from the trip cylinder 279 through pipe 328 and pipe 327 to the pump and suction is thus applied to the trip, as should be the case, because the picker 31 is picking up a sheet, it being remembered from the description of the tripping mechanism, that when the pickers pick up a sheet, suction must be applied to the trip cylinder 279 to move the trip piston away from the rod 276 to permit the latter to move down, or, if this were not to happen, the rod would remain up and trip the press when as a matter of fact, tripping is not wanted.

Also, the pump has pumped air into the air cylinder 311 through pipe 310 and port 318 (slide 315 being lifted to cut off pipe 317 and open up port 318 by means to be explained later). Hence air pressure is created within the cylinder behind the piston 312 and the latter moves to the left, operating the arm 314 and thus operating the feeder which now moves toward the press to feed the sheet.

The feeding movement of the feeder operates slide valve 292 to cut off pipe 331 and open up connection between the atmosphere and pipe 44 to break the vacuum in the picker so the sheet can be dropped on the platen. The cutting off of pipe 331 from the slide valve momentarily diminishes the air current passing to the pump through pipe 331, air chamber 306 and pipe 326, and automatically the pump will by suction open valve 307 to the atmosphere to supply the required air to the system.

The feeding movement has also resulted in operation of the two way valve 303 to close it, so that the plunger 305 remains up and the suction continues in the trip cylinder 279 by way of pipes 328 and 327.

The feeding movement having been completed, the piston 312 has reached the end of its stroke and slide 315 is lowered. The air is then pumped from the air cylinder 311 by way of pipes 310 and 317 to port 319 and into the cylinder driving the piston back and operating the feeder on its return or delivery stroke away from the platen.

The slide valve 294 is then again operated so that its port 294 connects pipes 331 and 329. The two way valve 303 is also operated and opened, hence communication is established with the plunger valve 304 up through pipes 330, valve 303 and pipe 329. Air enters the plunger valve, the plunger drops into normal closed position and cuts off the trip cylinder from the suction end of the system. This puts the trip cylinder in readiness to trip on the next feeding stroke if necessary.

From the foregoing it will be seen, that suction is applied constantly by the operation of the pump 309. The operation of the two way valve 303 regulates the suction applied to the trip cylinder by cutting off sooner or later the plunger valve 304 to time the trip.

The two-way valve 303 is timed by adjusting stops 333 on the valve stem 296. And the timing of the suction and breaking the vacuum in the pickers is controlled by the slide valve 292 which is timed by adjusting the length of the valve link 308 by an adjusting nut 334 such as is shown in Figure 8, the link 308 passing through a pivoted guide 335.

Referring back to Figure 43, the air cylinder slide 320 has been operated, by means to be explained later, to open the port 321 so that on the delivery stroke air will be blown from the cylinder through port 321 and pipe 323 to distributor 295 and via ports 299 and 300 to the paper nozzle 290, part of the air passing out through ports 298 and 301.

Should it be desired to operate the wind turbine 188 to drive shaft 185, the distributor will be set by means of the handle 302 to cut off port 301 and open port 297 to pipe 324, so that the air passing in to the distributor will be used both in the nozzle 290 and in the turbine.

The operations of the air cylinder 311 are controlled as follows: The movements of the aforesaid slide or slide valve 316 are effected by means of a cam bell crank 340, Figure 1, which is pivoted to the press at 341. The one end of said cam bell crank is pivotally connected to the slide valve as at 342, Figure 39. The other end is formed with a timing cam 343 operable between two stops 344 and 345 on the press. On the shaft 8 on the press there is secured a timing arm 346 having a cam roller 347. As the shaft 8 rotates with the press, the roller 347 engages the cam once to each revolution to depress the cam against stop 345 and lift the slide valve 316 to open the air inlet 318 in the air cylinder.

The bell crank 340 is moved in the opposite direction until the cam abuts stop 344 by means of a rod 348 which telescopes within a sleeve 349. The sleeve is carried by a bracket 350, Figures 40 and 41, fixed to a rod 351, which in turn is fixed to another bracket 352 secured to the piston rod 313.

As the piston rod slides to the left in Figure 1, the sleeve 349 slides on the rod 348 until near the end of the movement, when the end of the sleeve engages the rod to rock the bell crank 340 upwards to lower the slide valve 316 to close port 318 and open port 319 in the air cylinder and thus change the direction of the air within the cylinder.

The rod 351 serves to operate the upper horizontal slide valve 320, Figures 39 to 42. Said slide valve carries two pins 353 and 354 operable by an abutment 355 on the rod 351. The detailed construction is shown in Figures 40 and 42. On the rod 351 there is mounted a bearing 356 which supports a stud 357, which is free to slide in the bearing, but cannot rotate because of a key 358. The abutment 355 lies loosely on top of the bearing 356 and has two adjustable stops 359 and 360 adapted to take against a lug 361 rotatably carried on the stud 357 and centered by a collar 362 fast on the stud. The collar and lug 361 have cooperating slanting surfaces 363 and 364. A spring 365 pulls the collar and stud downward and hence the collar surface 363 (being nonrotatable) tends to turn the lug surface 364 into parallel position hence centers the lug as aforesaid.

In operation, while the piston 312 moves to the right, the slide valve port 366 registers with the cylinder port 322 and thus opens the cylinder to the atmosphere. When the cylinder completes its stroke, abutment 355 engages pin 354 to move the slide valve 320 to close port 322 and open port 321 to register with valve port 367 thus immediately releasing the pressure on the pressure side of the piston and the air passes through pipe 323 to distributor port 301 to the atmosphere, Figure 43, or through pipe 324 to the turbine 188.

When the piston completes its leftward stroke, the abutment engages the pin 353 to shift the slide valve, closing port 321 and immediately opening port 322 to release the pressure behind the piston.

In practice the parts cannot be so finely adjusted that the abutment 355 will stop exactly when the slide valve has been shifted, hence, at the end of the stroke in either direction, the abutment may yield or move backwards, its stops 359 or 360 (as the case may be) taking against center lug 361 and turn the same. This of course turns the lug surface 364 to lift the collar surface 363, hence lifts the collar 362 against the pressure of the spring 365 which thus takes up the play between the abutment and the lug. As soon as the abutment moves away from the pin, the spring 365 overcomes the resistance of the lug and the surface 363 by its downward pressure turns surface 364 into parallelism with itself, hence moves lug 361 back into center position. The play between the reciprocating pump piston and the swinging arm 314 to operate the feeder is compensated for by supporting the pump on a pivot 369 in a suitable bracket 370 secured to the press.

*The swing-away feature.*

This invention includes a construction which permits the feeder to be swung away from the press whenever such action becomes desirable. The construction further provides means insuring against accidental swinging of the feeder, and against attempts to do so unless the feeder is in proper position so that no damages may result from careless operation. The feature further includes means for automatic timing of the feeder with the press, when the feeder is swung back into position, and safety means for preventing damage to the feeder or press should it be attempted to operate the units out of time with each other. The swing away feature has been described in connection with Figures 4, 5 and 6. The other and additional features outlined under this heading are illustrated in Figures 34 to 38 to which reference will now be made.

The piston rod 313 is locked to the feeder operating arm 314 by the following means. See Figure 37. The piston rod is formed with a socket 372 to receive a tapered pin 373 fast in the arm 314. Engagement and disengagement of the pin from the socket is by a movement axial of the pin, that is, when in proper position, the pin (that is the arm and feeder) may be swung away from the socket (the air cylinder) and re-engagement is effected by so positioning the parts that the pin may directly enter the socket.

Normally the pin and socket are locked by a latch 374 mounted to slide on arm 314. The latch has a forked end 375 adapted to slide down in a groove 376 on the pin between the latter and a head 377. The latch is held in locked position by a spring 378. The latch is lifted or unlocked by its pin 379.

On the side of the feeder platform 10 there is pivoted a lever 380 which has a nose 381 adapted to engage and lift pin 379 and the latch when the tail 382 of said lever is depressed by an arm 383 fast on the shaft 27 which extends across the platform and which on the opposite side carries the locking hook 26 and handle 28, see Figure 6. So that when said handle is lifted and the hook swung away from under the locking pin 22, the said shaft 27 is rotated clockwise in Figures 34 and 35, arm 383 is swung down on the tail 382, the nose 381 is lifted and the latch 374 unlocked.

This, however, cannot take place, unless the latch pin is in the position shown in Figure 35, that is, unless the feeder is in full withdrawn position as indicated by the positions of the arm 314 and the separator arm 101. To insure this, there is provided a fixed cam 384 on the side of the platform 10. During the normal running of the feeder, the latch pin 379 swings under said cam and is locked against accidental lifting. In the proper position, however, as in Figure 35, the pin is free of the cam and may be lifted by lever 380. To insure that the latter cannot be operated to lift the pin 379 except at the proper time, there is pivoted at 385 a gravity latch 386 having a hook 387. It will be seen from Figure 34 that when the arm 314 and pin 379 swing to the left, the latch 386 will follow and assume a position with its hook 387 directly above the nose 381 of latch lifting lever 380. Hence the latter cannot be lifted and cannot be moved into the path of the pin 379 as the latter moves to the left. The pin on its leftward movement simply pushes the gravity latch out of the way.

It will therefore be apparent, that during operation the feeding mechanism is positively locked to its operating cylinder. That the feeder must be in withdrawn position or nonfeeding, before it can be unlocked. That the unlocking means, the lever 380, cannot be operated accidentally.

Means must also be provided to insure that after unlocking, the piston will remain at the end of its stroke so that the socket will be in the right position to receive the pin when the feeder is swung back into operative relation with the press. To this end there is provided a piston stem locking slide 388 moving in ways 389 on the base 17. The slide has prongs or lugs 390 adapted to engage on either side of a collar 391 fast on the piston rod 313. The collar has a pin 392 adapted to rest on the ledge 393 on the slide 388 between the lugs 390. Springs 394 tend to pull the slide upwards. Normally the slide is held in downward inactive position by an arm 395 fast on the shaft 27 as in Figure 34. But when said shaft is rotated by the unlocking of the platform 10 from the base 17, the arm 395 is swung upwards as in Figure 35 and consequently the slide 388 is free to rise by its springs 394 and the lugs 390 move up and seize the collar 391 between them, the pin 392 now resting on ledge 393 as in Figure 35 which shows the piston rod 313 held immovable and supported against sag while the feeder is swung away, thus insuring that the socket 372 is ready to receive the pin 373 when the feeder is swung back. By rotating shaft 27 in the opposite direction the parts are moved back into normal positions.

*Safety timing means.*

It often happens that while the feeder is swung away from the press, the latter is turned over by hand and when the feeder is swung back, the position of the platen may be such that feeding cannot commence. To guard the feeder against injury by commencing to feed out of time with the press, certain safety means are provided, see Figures 1 and 2.

On the platform 10 there is pivoted at 495 a gravity cam 396 connected by a link 397 to a pivoted arm 398 having a roller 399. On the press there is pivoted at 400 a safety timing lever 401 which is held against an adjustable stop 402 by a spring 403. When the press opens, the end 404 of link 5 engages the lever 401 at 405 and depresses the lever. Normally the roller 399 is held against the end 406 of the lever 401 by the weight of the cam 396.

The gripper mechanism 13 carries a link 407 connected to the gripper arm 101 by an arm 408 having a roller 409. During the normal running of the feeder and press, when the press opens, lever 401 is lowered and its surface 406 recedes from roller 399, which, however, follows due to the weight of cam 396. As the paper feeding elements now move toward the platen, roll 409 runs on cam 396, which springs downward so that the grippers will reach the platen in proper position, and the pickers will also be moved in over the platen in proper position to deliver the sheet, all as pointed out hereinbefore.

When the feeder is swung away the cam 396 would fall down and bring link 397 and arm 398 out of proper position. To prevent this the arm 398 is provided with a safety lug 410 and when the said shaft 27 is turned preparatory to unlocking the feeder platform, said safety lug 410 is engaged by a safety cam 411 on the shaft 27 to lock and hold the arm 398 and consequently the cam 396 in proper position as in Figure 1.

When the feeder is moved back into operating position, the shaft 27 is operated and the safety cam 411 removed from the safety lug 410. The cam 396 will move roller 399 into engagement with the safety timing lever 401. If the platen is closed operations may now commence with safety. If the platen is not closed, feeding would cause injury, but this is prevented because the lever 401 maintains cam 396 in position to lift the gripping and separating mechanism upward out of feeding position as in Figure 2.

To sum up: Cam 396 controls the raising and lowering of the grippers and pickers. In turn, the cam is positioned by portion 406 of lever 401. During the swing away period the cam is locked in upper position. When the feeder is moved back to feed, the cam is again positioned automatically by lever 401. If the platen is closed, the parts will be in position to feed. If the the platen is open, the parts will not be in position to feed because lever 401 will prevent cam 396 from lowering. If the platen is fully open, cam 396 will be lowered and the grippers and pickers may move towards the platen without injury being done.

The invention includes a few other features chiefly designed to safeguard the operation of the several mechanisms. By referring to Figure 27 it will be seen that the shaft 99 is connected by a toggle link 412 to a heavy spring 413, the other end of which is connected to shaft 27. As the shaft 99 is rotated anticlockwise in Figure 27, the toggle links will be straightened at the beginning of the movement and thereafter expand spring 413 which thus brakes the movement of the feeder.

To further avoid rigidity of movements and jars to the mechanism, flat springs as 414, see Figure 6, are secured to the lower ends of gripper arms 101 and 102. The springs rest against the lower ends of separator arms 53 and 54. There is a spring on each side of the feeder.

The feeding movement of parts 54 and 102 in Figure 6 is resisted by the spring and thus cushioned, tending to ease the operations of the gripping and separating mechanism. A violent blow at the end of the feeding movement is avoided because the springs 414 take against the links 100 which connect the posts on each side.

Figures 6 and 7 also illustrate a mechanism for preventing a heavy rebound of the moving parts of the feeder at the end of the forward movement away from the press. It must be kept in mind that the feeder is operated very fast because there is no dwell on the platen, and the swinging of the upper parts of the feeder back against the fixed frames 80 and 90 on the feeder platform is apt to cause a heavy rebound and prevent the proper functioning of the pickers in separating the paper.

The following mechanism prevents such rebound. To the gripper post 102 there is pivoted at 415 a tube 416 adapted to telescope with and slide over a rod link 417 pivoted to the platform 10 at 418. The tube 416 carries a bearing 419 and a latch 420 is pivoted at 421 on the bearing. The latch carries a weight 422 pivoted to it at 423 and having a movement relative to the latch and controlled by a pin 424 playing in a slot 425 in the weight. The latch is adapted to enter the tube through a slot 426 and engage on top of the head 427 of the rod 417.

During the feeding movement, towards the platen, the rod and tube telescope, the latch being held out of the tube by weight 422. At the end of the nonfeeding stroke, the feeder hits the frames 80 and 90 with a jar, which momentarily throws the weight 422 upwards to kick the latch 420 in through the slot 426 to momentarily prevent relative movement between the tube and the rod. Immediately thereafter the weight falls and again kicks the latch out of the tube. The action of this mechanism is instantaneous and momentarily locks the feeder in extreme nonfeeding position.

The main features of the invention and the operations of the above described mechanisms may be summarized as follows:—

The feeder is assembled in a unit and clamped to the press as in Figure 5, and the press itself will be provided with the timing means 346 and safety lever 401 with associated parts as shown in Figure 1, which also illustrates the air cylinder and locking means between the latter and the feeder. The gages are of course mounted on the platen.

In operation, the paper is placed on top of the pile elevator at 11 and the motor started. The separator mechanism will then separate the top sheet from the pile, and together with the gripping mechanism convey the sheet to the platen. As the sheets are printed, the grippers will remove them from the platen and deposit them in the box 16. As the pile of sheets diminishes in height, the pile elevator will lift the sheets. The printed sheets will be taken away from time to time.

Should a sheet fail to be printed, the tripping mechanism will operate to trip the press automatically and again untrip.

The safety features include the positive locking arrangement between the air cylinder and the feeder operating arm 314, and that the feeder cannot be swung away unless in extreme forward or nonfeeding position. Also the elements which insure the position of the piston rod for re-engagement with said arm 314. They also include the elements shown in Figure 2 for moving the separating and gripping mechanisms out of the way of the platen if the latter is not in position to receive the sheet.

The pneumatic system for operating the feeder and controlling several of its sub-mechanisms is of particular advantage in being independent of the motive power for the press, and also because it supplies a more elastic means for operating the feeder than is possible through direct mechanical connections with the press itself.

The feeder as herein disclosed has been tested and in practice solved the problem of feeding a Golding press, and while arranged and designed in connection with a Golding press, nevertheless the invention is not limited thereto as is obvious, and changes and modifications may readily be made by those skilled in the part so as to adapt the invention or parts thereof to other presses, without departing from the principle of the invention and the scope of the appended claims.

I claim:—

1. The combination of an automatic paper feeding mechanism for feeding paper to printing position in a printing machine, pneumatic paper separators therein, pneumatically actuated means for operating said mechanism and an air pump for driving said pneumatically actuated means and for applying suction to the said paper separators.

2. The combination of an automatic paper feeding mechanism for feeding paper to printing position in a printing machine, penumatic paper separators therein, pneumatically actuated means for operating said mechanism, a rotary air pump for supplying air to the said pneumatically actuated means and for applying suction to the said paper separators and a valve for cutting off the suction from the separators at predetermined intervals.

3. The combination of an automatic paper feeding mechanism, pneumatic paper separators therein, an air driven turbine in said mechanism for the purpose set forth, an air engine for driving said mechanism, a pump for supplying air to said engine to operate the same and for applying suction to the said separators, a valve for controlling the suction aforesaid and means for operating the said air driven turbine by the exhaust air from the said engine.

4. The combination of an automatic paper feeding attachment for presses, paper separating means and press tripping means in said attachment, an air driven engine for operating said attachment, a pump for supplying a constant stream of air to said air driven engine, means for applying constant suction from said pump to the said separating and tripping means, a valve for controlling the suction applied to said separating means and another valve operated in sequence after said first valve for controlling the suction applied to said tripping means.

5. In a pneumatically operated paper feeding attachment of the character described, the combination of paper separating means, printing press tripping means, an air driven turbine for the purposes set forth, an air actuated engine for operating said attachment, a pump supplying a constant stream of air to said engine, means for utilizing the exhaust air from said engine to operate the said turbine at will, pipes between said separating and tripping means and the said pump for applying constant suction thereto and valves for controlling the said suction.

6. In a pneumatically operated paper feeding attachment of the character described, the combination of paper separating means, printing press tripping means, an air driven turbine for the purposes set forth, an air actuated engine for operating said attachment, a pump supplying a constant stream of air to said engine, means for utilizing the exhaust air from said engine to operate the said turbine at will, pipes between said separating and tripping means and the said pump for applying constant suction thereto, valves in said pipes for controlling the suction therein and means in said mechanism for operating the said valves automatically.

7. In a pneumaticaly operated paper feeding attachment of the character described, the combination of paper separating means, a pump for applying suction to said separating means to separate the paper, a valve for momentarily cutting off the suction aforesaid and an automatic air valve for supplying air to the pump when the suction is momentarily cut off as aforesaid.

8. In a pneumatically operated paper feeding attachment of the character described, the combination of paper separating means, printing press tripping means, a pump for applying constant suction to operate the said separating and tripping means, a normally closed valve for controlling the suction applied to said tripping means, and automatic means for preventing the opening of said normally closed valve when the said paper separating means fail to operate.

9. The combination of a paper feeding mechanism of the character set forth, a system of pneumatic operation for said mechanism including pneumatic paper separating means, pneumatically operated printing press tripping means, an air driven turbine for the purpose set forth and a paper blow nozzle, a pump for supplying a continous stream of air to certain of said named devices and for applying continuous suction to certain others of said named devices, valves controlling the sequence of operating of said devices and means in said mechanism for automatically operating and timing the said valves.

10. The combination of a paper feeding device of the character described including an air driven turbine for operating certain parts of said device at predetermined intervals, a pump for supplying air to said turbine and manually operated means between said pump and turbine for establishing communication between the said two named elements.

11. The combination with a press, of a paper feeding attachment therefor, an air engine for operating said attachment and means on said press for synchronizing the operation of said air engine and press.

12. The combination with a press, of a paper feeding attachment therefor, pneumatically operated means for operating said attachment and means actuated by said press for synchronizing the operation of the said engine with the operation of the press.

13. The combination with a press, of an attachment as described adapted to be moved into and out of operative relation with the press, means for operating said attachment, means for locking said attachment to its said operating means, devices for locking said attachment in its operative position with relation to the press and mechanism controlled by the said devices for preventing accidental unlocking of the said locking means.

14. The combination with a press, of an attachment as described adapted to be moved into and out of operative relation with the press, a reciprocating piston rod for operating said attachment, means for locking the attachment to said piston rod, devices for locking the attachment in its operative position with relation to the press, mechanism controlled by said devices for maintaining said locking means in locked position and means for automatically unlocking said attachment from said piston rod when said devices have been unlocked.

15. The combination of an attachment as described, an engine for operating the same, means for attaching and detaching said attachment with relation to said engine, devices normally locking said attachment in attached relation with said engine, controlling means preventing accidental detachment of said attachment with relation to the said engine and mechanism automatically operable upon the unlocking of the said locking devices for maintaining said engine in its operative position with respect to the said attachment.

16. The combination of an attachment as described, an engine having a piston and piston rod, means for automatically locking said piston rod to the said attachment to operate the same, devices for unlocking said locking means and mechanism operable upon the unlocking of said locking means for maintaining said piston rod in operative position with relation to said attachment.

17. The combination of a support, an attachment as described pivoted to said support and adapted to be moved to one side thereof for the purpose set forth, an engine having a piston and piston rod for operating said attachment on said support, an operating arm on said attachment, means on said arm for locking the same to the said piston rod, manually operated means for unlocking the said locking means and mechanism automatically operable upon the unlocking of said locking means for maintaining said piston rod in operative position with relation to said operating arm.

18. The combination with a printing press, of a support secured thereto, a paper feeding attachment for said press pivoted on said support and adapted to be moved into and out of operative relation with respect to said press, an operating arm in said attachment, an engine for driving the same, a piston and piston rod in said engine, automatic means for locking said operating arm to the said piston rod while the attachment is in operative position with respect to the press, safety means preventing accidental unlocking of said locking means, manually operated means for releasing said safety means and automatic devices operable upon the releasing of said safety means for maintaining said piston rod immovable in operative position with respect to the said operating arm.

19. The combination with a printing press, of a support secured thereto, a paper feeding attachment for said press pivoted on said support and adapted to be moved into and out of operative relation with respect to said press, an operating arm in said attachment, an engine for driving the same, a piston and piston rod in said engine, automatic means for locking said operating arm to the said piston rod while the attachment is in operative position with respect to the press, safety means preventing accidental unlocking of said locking means, mechanism adapted to hold said piston rod immovable while the attachment is moved away as aforesaid, manually operated means for locking the attachment in operative position, an arm in said manually operated means for normally disengaging said mechanism from said piston rod and means automatically operable upon the unlocking of said attachment for causing said mechanism to engage the piston rod as aforesaid.

20. The combination with a press, of an attachment as described adapted to be moved into and out of operative relation with said press, an engine, normally engaged movable members in said engine and attachment for driving the latter, means for disengaging said members preparatory for moving the attachment out of operative relation with the press, automatic means operable upon the disengagement of said members to maintain the member in the engine immovable while the attachment is moved away as aforesaid and in position to reengage the said member in the attachment when the latter is again moved into operative relation with the press.

21. In a device of the character described the combination of a support, a paper feeding attachment pivoted thereon and adapted to be moved to one side thereof and back again for the purpose set forth, a shaft mounted on said attachment, a pin on one side of the support and a hook on said shaft for locking the attachment to the support, driving means for the attachment, means on the other side of said support for normally preventing disengagement between the attachment and its driving means and mechanism on the attachment operable by the rotation of said shaft for causing the disengagement of the attachment and its driving means.

22. In a device of the character described the combination of a separator carriage, paper separating means thereon, means for operating said carriage to feed the separated paper and mechanism on said carriage for instantaneously operating the separating means into contact with and away from the paper prior to the feeding movement of said carriage.

23. In a device of the character described the combination of a paper separating carriage, a framework pivoted thereon, paper separating nozzles carried by said framework, means for swinging said carriage in an arc towards and away from the paper to be separated, means for maintaining said framework and nozzles in a fixed position relative to said carriage while it swings as aforesaid, devices for imparting to said framework and nozzles a sudden downward movement at the end of said swinging movement in one direction and a spring for causing the automatic operation of said devices.

24. In a device of the character described the combination of a paper separating carriage, a framework pivoted thereon, paper separating nozzles carried by said framework, means for swinging said carriage in an arc towards and away from the paper to be separated, means for maintaining said framework and nozzles in a fixed position relative to said carriage while it swings as aforesaid, devices for imparting to said framework and nozzles a sudden downward movement at the end of said swinging movement in one direction and a spring for causing the automatic operation of said devices, means for keeping said spring inactive until the end of said swinging movement and means for rewinding the spring during a portion of said swinging movement.

25. In a device of the character described the combination of a shaft, a pair of arms secured thereto and extending upwards therefrom, a gripping mechanism carried by the upper ends of said arms, a second shaft, a second pair of arms pivoted thereon and extending upwards therefrom, a separating mechanism carried by said second pair of arms above the said gripping mechanism, links connecting the said pairs of arms and means for oscillating one of the said shafts for the purpose set forth.

26. The combination with a platen press, of an attachment of the character described comprising paper feeding and paper removing devices, means for swinging the said devices towards the platen while the latter is in open position, means on said devices for adjustably regulating the position of the said conveying devices above the open platen and movable means cooperating with the paper removing devices aforesaid for supporting the paper while it is being removed from the platen.

27. The combination with a platen press, of an attachment of the character described comprising paper feeding and paper removing devices, means for swinging the said devices towards the platen while the latter is in open position, a roller adjustably carried by said removing device, a cam carried by said conveying device and adapted to run on said roller to regulate the position, means on said devices for adjustably regulating the position of the said conveying devices above the open platen and movable means cooperating with the paper removing devices aforesaid for supporting the paper while it is being removed from the platen.

28. The combination with a platen press, of an automatic paper feeding attachment of the character described comprising fixed supporting means, paper conveying and paper removing devices pivoted on said fixed supporting means, mechanism for swinging said devices towards and away from the said platen, fixed means for supporting the paper during its movements towards the platen and movable means pivoted on said supporting means for supporting the paper during its removal from the platen.

29. The combination with a platen press, of devices for feeding paper to the platen thereof, grippers for removing the printed paper from the platen, means for closing said grippers to remove the paper, a delivery box and means carried by said feeding devices for opening the grippers to deposit the paper in the delivery box.

30. The combination with a platen press, of a paper feeding mechanism therefor, paper removing grippers, means for closing the grippers to remove the paper from the platen and means connected to said paper feeding mechanism for opening said grippers to deliver the paper removed from the platen.

31. The combination with a platen press, of paper delivery grippers therefor, means for operating said grippers towards the platen, devices for maintaining said grippers in open position while being operated towards the platen, means for closing the gripper by contact with the platen, gripper opening means, mechanism for actuating said opening means to open the grippers after they have been closed, said mechanism being operated into position to effectuate such opening while the grippers move towards the platen.

32. The combination with a platen press, of a delivery mechanism therefor comprising grippers for delivering the printed sheet from the platen, means for moving said grippers towards the platen to seize the printed sheet thereon, means for closing the grippers on the printed sheet, devices in said delivery mechanism for maintaining the grippers in open position while they are being moved as aforesaid, gripper opening means operable into a position to cause the grippers to be opened while the grippers move towards the platen and devices for actuating said opening means on the return movement of the grippers to cause the latter to deliver the printed sheet.

33. The combination with a platen press, of a gripping mechanism therefor comprising delivery grippers, devices for maintaining said grippers in normally open position, a locking lever in said devices, a gripper release in engagement with said locking lever to prevent untimely closing of the grippers, means for operating the said devices into a position to permit said release to be disengaged from the said lever and springs operable upon said disengagement to automatically close the grippers.

34. The combination with a platen press, of a gripping mechanism therefor comprising delivery grippers, devices for maintaining said grippers in normally open position, a locking lever in said devices, a gripper release, means for causing the release to engage said locking lever to prevent untimely closing of the grippers, means for moving said devices into position to permit said release to become disengaged from said locking lever, means for actuating said release by contact with the platen and springs for automatically closing the grippers when said actuating means contact with the platen.

35. A gripper mechanism of the character described comprising supporting arms, a gripper bar carried thereby, grippers on said bar, springs for closing the grippers, a shaft supported on said arms, a gripper opening lever on said shaft, a gripper opening cam in engagement with said opening lever to prevent the grippers from closing, a locking lever on said shaft, a gripper release on said bar in locking engagement with said locking lever to prevent untimely closing of the grippers, means on said release for disengaging it from said locking lever to permit the said springs to close the grippers and devices for moving said gripper lever into position to permit the said gripper locking lever to be disengaged from the said gripper release as and for the purpose set forth.

36. A gripper mechanism of the character described comprising supporting arms, a gripper bar carried thereby, grippers on said bar, springs for closing the grippers, a shaft supported on said arms, a gripper opening lever on said shaft, a gripper opening cam in engagement with said opening lever to prevent the grippers from closing, a locking lever on said shaft, a gripper release on said bar in locking engagement with said locking lever to prevent untimely closing of the grippers, means on said release for disengaging it from said locking lever to permit the said springs to close the grippers and devices for moving said gripper opening lever into position to permit the said gripper locking lever to be disengaged from the said gripper release as and for the purpose set forth, and means for operating said supporting arms and the said devices.

37. The combination with the platen of a press, of a gripping mechanism as described comprising grippers for removing the printed sheet from the platen, means for moving the grippers towards and away from the platen, means for locking the grippers in open position while they travel toward the platen, springs for closing the grippers, means for unlocking the grippers by contact with the platen to permit said springs to act, devices for opening the grippers and means, actuated during the movement of the grippers towards the platen, for moving said devices into position to open the grippers during their return movement from the platen.

38. The combination with a platen press, of a gripping mechanism therefor comprising grippers for removing the sheet from the platen, supporting arms for moving the grippers towards and away from the platen, means for locking the grippers in open position while they move towards the platen, springs for closing the grippers when they reach the platen, means in said locking means for unlocking the grippers to permit the said springs to act, devices for opening the grippers, adjustable members, actuated during the movement of the grippers towards the platen, for moving said opening devices into position to act on the return movement of the grippers to open the same and other means movable with and connected to the said supporting arms for operating the said adjustable members.

39. The combination of a platen press, a tripping mechanism therefor mounted upon the platen thereof, a bracket secured to the press, a tripping cylinder on said bracket, a tripping member in said cylinder, a lever pivoted to said tripping mechanism and extending into the path of said tripping member and pneumatic means for operating said tripping member away from said lever during the normal operation of the press.

40. The combination of a platen press, a tripping mechanism therefor mounted on the platen, a pneumatic paper separating mechanism for said press, a lever pivoted on said tripping mechanism and provided with stops, a tripping cylinder, a member therein adapted to engage one of said stops to intercept the movement of said lever to actuate the tripping mechanism to trip the press and pneumatic means controlled by said pneumatic paper separating means for operating the said member.

41. In an attachment of the character described the combination of paper feeding and paper removing mechanisms, a base for supporting the same, means for operating said mechanisms from an initial position to an operating position and back and devices interposed between said mechanisms and the base for momentarily checking the rebound of said mechanisms at the end of their return movement.

42. In an attachment of the character described the combination of paper feeding and paper removing mechanisms, a base for supporting the same, means for operating said mechanisms from an initial position to an operating position and back, a sleeve pivoted to said mechanisms, a rod pivoted to said base and slidably supported within said sleeve, a latch carried by the latter and automatically operable at the end of the return movement of said mechanisms to check their rebound.

43. The combination with a platen press, of devices for engaging the leading edge of a sheet of paper placed on said platen comprising a cam lever pivoted to the platen frame, sheet engaging fingers carried by said cam lever, a cam roller adapted to coact with said lever to operate the same so as to move the said fingers in upon the platen, said lever being operated by gravity to withdraw said fingers from the platen.

44. The combination with a platen press and a fixed shaft thereon, of devices for engaging the leading edge of a sheet of paper placed on the platen and comprising a roller adjustably mounted on said shaft, a lever pivoted on the platen frame, sheet engaging fingers carried by said lever which is adapted to coact with said roller to cause said fingers to be moved in upon the platen when the latter is in open position, and which lever is gravity operated to withdraw said fingers from the platen when the latter closes.

45. The combination with a platen press, of an automatic feeder therefor comprising a base, means for securing it to the press, a platform pivoted on said base, automatic paper manipulating devices mounted on said platform, an air engine pivoted in relatively fixed relation to said press and said automatic feeder detachable means for operating said feeder from said engine and means on the press for timing the operation of the engine.

46. The combination with a platen press, of an attachment therefor of the character described comprising paper feeding and delivery mechanisms non-operatively connected to said press, an engine, means for operating said mechanisms together towards and away from the press, operating actuating means secured to said attachment and detachably connected to the said engine, operating means for the latter and means secured to the press for controlling the operation of the said engine.

47. The combination with a platen press, a platen therein having an uninterrupted movement from open position to impression and vice versa, of an attachment of the character described comprising a support, pneumatically operated paper separating means pivoted on said support, pneumatically operated platen tripping means secured to the said press, an engine for applying suction to said pneumatically operated means, detachable connecting means between said engine and attachment for operating the latter, valves in said attachment for automatically controlling the suction aforesaid and means secured to the press for controlling the operation of said engine, said attachment being adapted to be swung away from operative relation with the press when said detachable connecting means are detached from the press.

LEWIS E. MORRISON.